United States Patent
Nishida et al.

(10) Patent No.: US 9,612,788 B2
(45) Date of Patent: Apr. 4, 2017

(54) TERMINAL APPARATUS, INFORMATION PROCESSING SYSTEM, AND OUTPUT METHOD

(71) Applicants: Takayori Nishida, Kanagawa (JP); Munetake Moroyama, Tokyo (JP)

(72) Inventors: Takayori Nishida, Kanagawa (JP); Munetake Moroyama, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/983,964

(22) Filed: Dec. 30, 2015

(65) Prior Publication Data

US 2016/0196096 A1 Jul. 7, 2016

(30) Foreign Application Priority Data

Jan. 6, 2015 (JP) .................. 2015-000919

(51) Int. Cl.
*G06F 3/12* (2006.01)

(52) U.S. Cl.
CPC .......... *G06F 3/1288* (2013.01); *G06F 3/1211* (2013.01); *G06F 3/1236* (2013.01)

(58) Field of Classification Search
None
See application file for complete search history.

(56) References Cited

U.S. PATENT DOCUMENTS

| | | | |
|---|---|---|---|
| 8,760,729 B2 | 6/2014 | Oseto et al. | |
| 2004/0218204 A1* | 11/2004 | Nomura | H04L 67/02 358/1.14 |
| 2015/0049360 A1* | 2/2015 | Lee | G06F 3/1292 358/1.15 |
| 2015/0169266 A1* | 6/2015 | Iwasaki | G06F 3/1222 358/1.14 |

FOREIGN PATENT DOCUMENTS

| | | |
|---|---|---|
| JP | 2012-248006 | 12/2012 |
| JP | 2014-182403 | 9/2014 |
| JP | 2015-219545 | 12/2015 |

* cited by examiner

*Primary Examiner* — John Wallace
(74) *Attorney, Agent, or Firm* — Cooper & Dunham LLP

(57) ABSTRACT

A terminal apparatus connected to another terminal apparatus and an output apparatus via a network includes a proxy output request receiver unit receiving a proxy output request for data specifying a proxy user, a connecting information acquisition unit acquiring information for connecting to the other terminal apparatus in association with the proxy user from a management apparatus managing the information for connecting to the other terminal apparatus in association with the proxy user, a storing unit storing the data for which the proxy output request is received, a document information registration request unit transmitting a registering request to register document information relating to the proxy output request for the data using the information, and a data provider unit receiving an acquisition request for the data for which the proxy output request is received, and provide the output apparatus with the data for which the proxy output request is received.

9 Claims, 22 Drawing Sheets

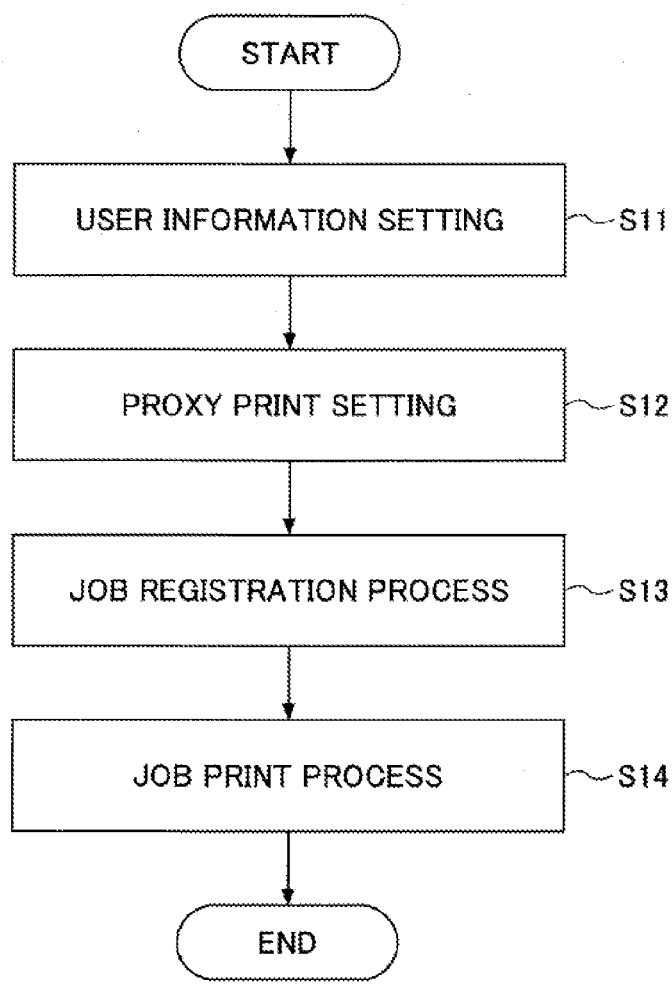

FIG.9

SETTINGS
- MANAGEMENT
- INSTALLATION/UPDATING
- REMOTE SETTINGS
- MESSAGE CENTER
- USAGE REPORT
- NETWORK
- PRINT APPLICATION
  - COMMON SETTINGS
  - JOB ACCUMULATION SETTINGS
  - PROXY PRINT SETTINGS
  - ACCOUNT SETTINGS

☐ PROXY PRINT SETTINGS

SELECT PROXY USER
USERS SELECTED IN THIS SECTION ARE DISPLAYED AS OPTIONAL PROXY USERS FOR USE IN PROXY PRINTING.

| LOGIN USER NAME | AUTHENTICATION SETTING NAME | NAME |
|---|---|---|
| ☐ Mori | AAM | Mori Shinya |
| ☐ User 1 | AAM | User 1 |
| ☐ User 2 | AAM | User 2 |
| ☐ User 3 | AAM | User 3 |

☐ PROXY IS NOT SELECTED AT EVERY PRINTING

SELECT CANDIDATE FOR PROXY USER ...

PRINTER
PRINTER: OOO SP 3610 PCL 6

RESTORE DEFAULT    APPLY

OK    CANCEL

1000

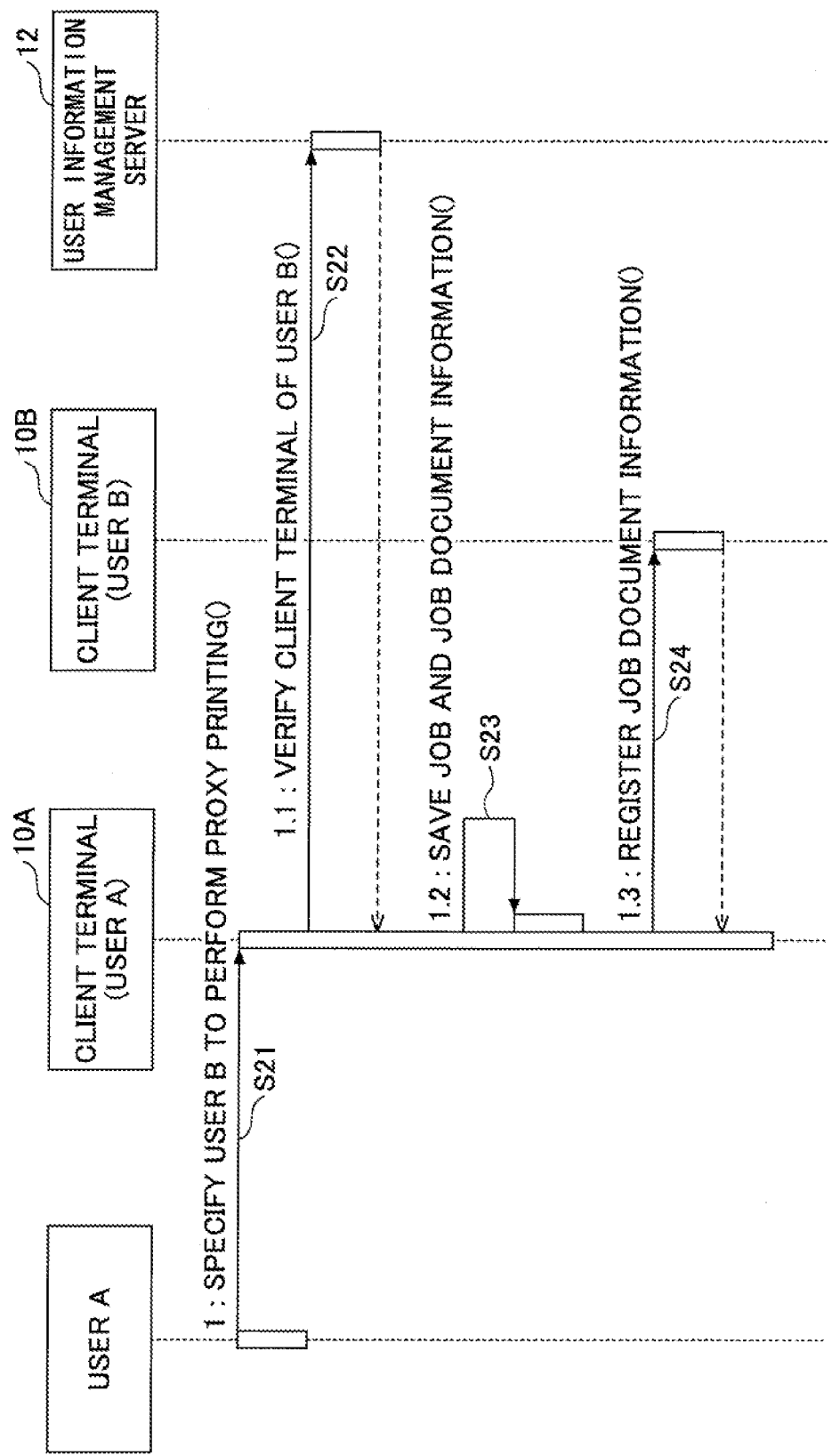

FIG.12

| id | user_id | delegation_user | job_name | client_address | port | data_file_path | registered_time | page | duplex | color | nup | copies |
|---|---|---|---|---|---|---|---|---|---|---|---|---|
| 1 | User B | User A | Test Data 2 | pc_for_user_b | 8080 | C:¥ProgramData ¥2.prn | 2014/10/1 9:15 | 4 | on | Color | 2 in 1 | 4 |
| 2 | User A | User B | Test Data 3 | pc_for_user_a | 8081 | C:¥ProgramData ¥3.prn | 2014/10/2 9:15 | 3 | off | Color | 2 in 1 | 2 |

FIG.13

| id | user_id | delegation_user | job_name | client_address | port | data_file_path | registered_time | page | duplex | color | nup | copies |
|---|---|---|---|---|---|---|---|---|---|---|---|---|
| 1 | User B | | Test Data 1 | pc_for_user_b | 8080 | C:¥ProgramData ¥1.prn | 2014/10/1 9:00 | 2 | on | B&W | | 3 |
| 2 | User B | User A | Test Data 2 | pc_for_user_b | 8080 | C:¥ProgramData ¥2.prn | 2014/10/1 9:15 | 4 | on | Color | 2 in 1 | 4 |
| 3 | User A | User B | Test Data 3 | pc_for_user_a | 8081 | C:¥ProgramData ¥3.prn | 2014/10/2 9:15 | 3 | off | Color | 2 in 1 | 2 |
| 4 | User C | User B | Test Data 4 | pc_for_user_c | 8083 | C:¥ProgramData ¥4.prn | 2014/10/2 13:00 | 1 | off | Color | | 3 |
| 5 | User B | | Test Data 5 | pc_for_user_b | 8080 | C:¥ProgramData ¥5.prn | 2014/10/2 14:10 | 1 | off | Color | | 1 |

FIG.14

| id | user_id | delegation_user | job_name | client_address | port | data_file_path | registered_time | page | du-plex | color | nup | copies |
|---|---|---|---|---|---|---|---|---|---|---|---|---|
| 1 | User C | User B | Test Data 4 | pc_for_user_c | 8083 | C:¥ProgramData ¥4.prn | 2014/10/2 13:00 | 1 | off | Color | | 3 |

FIG.16

SECURE PRINT MANAGER
Please select job(s) to either print or delete.

Server | Slct.JobOwner | Refresh | Home | Logout

Total : 5 job(s)

| | | | | | |
|---|---|---|---|---|---|
| Test Data 1 2014/10/1 9:00 am | Page : 2 | Copies : 3 | 2 sided | B&W | pc_for_user_b |
| Test Data 2 2014/10/1 9:15 am | Page : 4 | Copies : 4 | 2 sided | Color | pc_for_user_b |
| Test Data 3 2014/10/1 9:15 am | Page : 3 | Copies : 2 | 1 sided | Color | pc_for_user_a |
| Test Data 4 2014/10/2 1:00 pm | Page : 1 | Copies : 3 | 1 sided | Color | pc_for_user_c |
| Test Data 5 2014/10/2 2:10 pm | Page : 1 | Copies : 1 | 1 sided | Color | pc_for_user_b |

Select All | Previous | 1/1 | Next

Set | Delete | Print 1100, 1101, 1102

TERMINAL APPARATUS, INFORMATION PROCESSING SYSTEM, AND OUTPUT METHOD

BACKGROUND OF THE INVENTION

1. Field of the Invention

The disclosures discussed herein relate to a terminal apparatus, an information processing system, and an output method.

2. Description of the Related Art

Related art print systems generally allow users to save print jobs in a file server or a cloud in advance, and the users input the user names and passwords through the operations panels of multifunctional peripherals to display a list of the print jobs saved by the users themselves and select the desired print jobs when printing the desired print jobs.

In addition, there is proxy user printing technology known in the art (e.g., see Japanese Laid-open Patent Publication No. 2014-182403), which enables proxy users to execute owner's print jobs when a user (an owner) who registers print a job differs from a user (a proxy user) who executes the registered print job. In the proxy user printing technology, a proxy user is capable of executing a print job with the access authorization of an owner, which is obtained by registering the proxy user identification information in association with the owner identification information.

For example, the proxy user printing may be achieved by registering the document information of the print jobs in the server that manages all the inquiries from the multifunctional peripherals. Since the multifunctional peripherals are configured to receive the print jobs from the server, the owner is able to obtain, when the proxy user has logged in, a list of the print jobs including the print jobs that the owner has requested the proxy user to execute.

However, when the owner desires to register the document information of the print jobs in a client in advance, the document information of the print jobs that the owner has requested the proxy user to execute are registered in the owner's client. Since the multifunctional peripherals are configured to acquire the print jobs from the login proxy user's client, the owner is not able to acquire the print jobs that have been registered in the owner's client and that the owner has requested the proxy user to execute.

Similarly, in a proxy user output technology that allows the proxy user to cause the output apparatus such as projectors or monitors to output the output jobs that the owner has requested the proxy user to execute, the owner is also not able to acquire the output jobs that the owner has requested the proxy user to execute.

RELATED ART DOCUMENT

Patent Document

Patent Document 1: Japanese Laid-open Patent Publication No. 2014-182403

SUMMARY OF THE INVENTION

Accordingly, it is a general object in one embodiment of the present invention to provide a terminal apparatus capable of performing proxy outputting when the terminal apparatus registers document information subject to proxy outputting that substantially obviates one or more problems caused by the limitations and disadvantages of the related art.

According to an aspect of embodiments, there is provided a terminal apparatus connected to another terminal apparatus and an output apparatus via a network. The terminal apparatus includes a proxy output request receiver unit configured to receive a proxy output request for data specifying a proxy user; a connecting information acquisition unit configured to acquire information for connecting to the other terminal apparatus in association with the proxy user specified in the proxy output request, from a management apparatus configured to manage the information for connecting to the other terminal apparatus in association with the proxy user; a storing unit configured to store the data for which the proxy output request is received; a document information registration request unit configured to transmit to the other terminal apparatus a registering request to register document information relating to the proxy output request for the data by using the information for connecting to the other terminal apparatus; and a data provider unit configured to receive from the output apparatus that has acquired the document information relating to the proxy output request for the data from the other terminal apparatus, an acquisition request for the data for which the proxy output request is received, and provide the output apparatus with the data for which the proxy output request is received.

Other objects, features and advantages of the present invention will become more apparent from the following detailed description when read in conjunction with the accompanying drawings.

BRIEF DESCRIPTION OF THE DRAWINGS

FIG. 7 is a flowchart illustrating an example of a process of proxy user printing;

FIG. 8 is a configuration diagram illustrating an example of user information registered in the user information management server;

FIG. 9 is an image diagram illustrating an example of a proxy user print setting screen;

FIG. 10 is a sequence diagram illustrating an example of a job registering process;

FIG. 12 is a configuration diagram illustrating an example of print job document information;

FIG. 13 is a configuration diagram illustrating an example of print job document information;

FIG. 14 is a configuration diagram illustrating an example of print job document information;

FIG. 16 is an image diagram illustrating an example of a print job list displayed on an operations panel;

DETAILED DESCRIPTION OF THE PREFERRED EMBODIMENTS

In the following, an embodiment is described in detail. Note that an information processing system according to embodiments described below may be applied to an information processing system that outputs (prints, projects, or displays) output jobs registered in client terminals from output apparatuses. In the following embodiments, an illustration is given of examples of a process of printing the print jobs registered in the client terminal from the output apparatus.

First Embodiment

System Configuration

Figure 1:
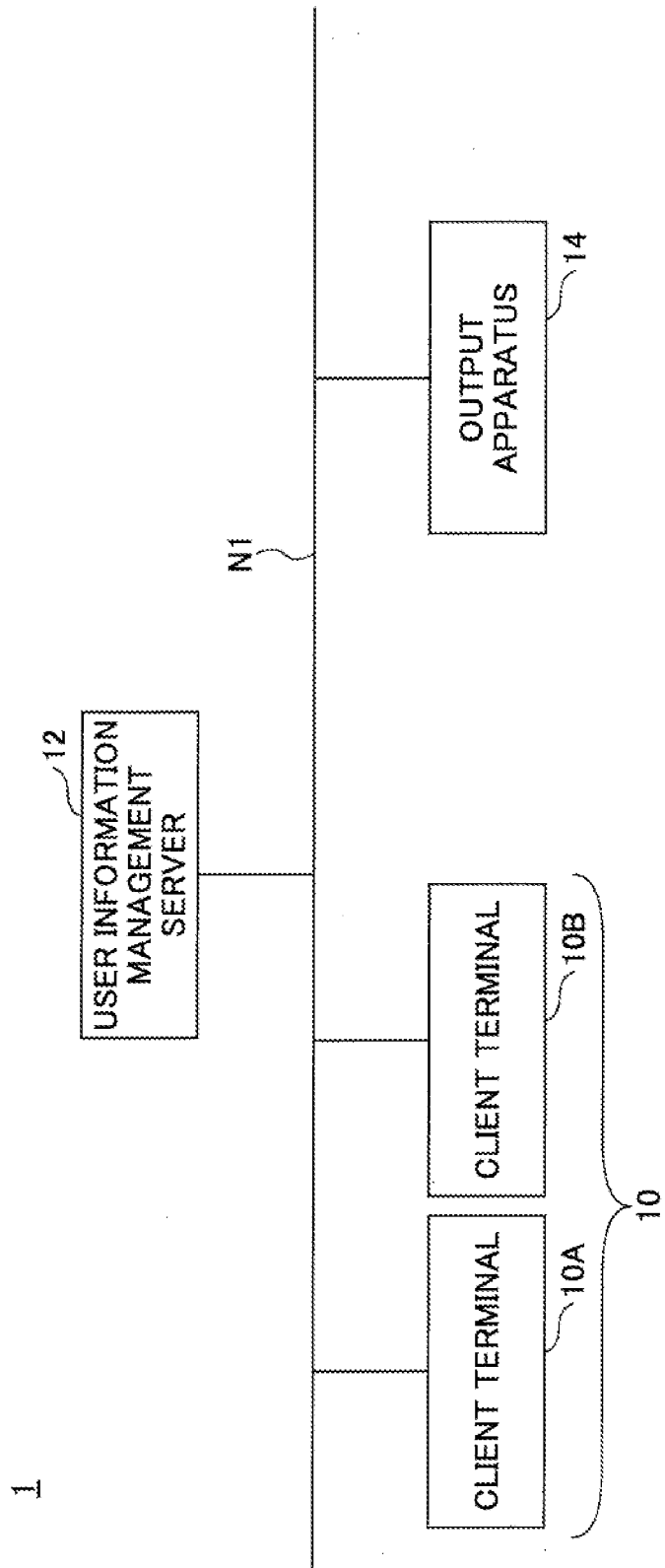
FIG. 1 is a configuration diagram illustrating an example of an information processing system according to an embodiment.

FIG. 1 is a configuration diagram illustrating an example of an information processing system according to an embodiment. The information processing system illustrated in FIG. 1 includes client terminals 10, a user information management server 12, and an output apparatus 14 that are connected via a network N1. Note that the information processing system 1 of FIG. 1 illustrates an example having a client terminal 10A for a user A and a client terminal 10B for a user B as the client terminals 10.

The client terminals 10, the user management server 12, and the output apparatus 14 have wired or wireless communications components. FIG. 1 depicts an example of the information processing system 1 having one user information management server 12 and one output apparatus 14; however, the information processing system 1 may have two or more user information management servers 12 and two or more output apparatuses 14.

The client terminal 10 is a terminal apparatus used by a user. Examples of the client terminal 10 include smartphones, mobile phones, tablet terminals, and personal computers (PCs). The client terminal 10 is configured to save print jobs output from the output apparatus 14, and has an application installed for providing the print jobs to the output apparatus 14 based on a request from the output apparatus 14.

The user information management server 12 may be implemented by one or more information processing apparatuses. The user information management server 12 is configured to manage user information, and hold mapping information between each of users and the client terminals 10.

The output apparatus 14 is configured to acquire a print job list from the client terminal 10 of the user who has logged in, and display the acquired print job list. When the user selects a desired one of print jobs from the print job list, the output apparatus 14 acquires the selected print job from the client terminal 10, and executes the acquired print job. The output apparatus 14 is configured to acquire a host name or an IP address for connecting to the client terminal 10 in association with the login user, or the client terminal 10 that saves the print job from the user information management server 12.

Note that the output apparatus 14 may be a printer apparatus that performs printing such as a printer, a copier, a multifunctional peripheral, and a laser printer; a projector apparatus or a display apparatus that projects or displays images such as a projector or a monitor; and an audio output apparatus that output sound such as an audio apparatus.

In the information processing system 1, a manager or the like registers a host name or an IP address of a client terminal 10 of each client in association with user identification information such as a user ID.

Further, a user (owner) who registers the print jobs may need to register one or more user candidates (proxy users) who can execute the registered print jobs on behalf of the owner in order to utilize a proxy user printing system. For example, a user A who is the owner sets a user B as one of proxy user candidates. The client terminal 10A of the user A acquires from the user information management server 12 a host name and an IP address of the client terminal 10B of the user B registered as the proxy user candidate.

Note that the first embodiment describes an example of the information processing system 1 in which the client terminal 10A inquires of the user information management server 12 to provide the host name and the IP address of the client terminal 10B, and acquire the host name and the IP address of the client terminal 10B when the user B is set as the proxy user candidate of the client terminal 10B.

The user A serving as the owner specifies, for example, the user B from the proxy user candidates to perform the proxy user printing. Note that the client terminal 10A of the user A may query the user information management server 12 to verify whether the host name or the IP address of the client terminal 10B has been updated.

The client terminal 10A saves document information and data of the print job in the client terminal 10A of the owner, and registers the document information of the print job (hereinafter also simply called "print job document information" or "document metadata") in the client terminal 10B of the proxy user. Note that the print job document information includes a document name, color/monochrome attribute, the number of pages, the number of copies, single-side/double-side printing, and the like that are used to execute the print job.

When the user B logs in via the operations panel 602, the output apparatus 14 sends an inquiry to the client terminal 10 of the user B for acquiring a print job list. Note that the print job document information registered in the client terminal 10B includes document information of the print job the proxy user printing of which is requested by the user A.

When the user B selects via the operations panel 602 the print job the proxy user printing of which is requested by the user A, and executes a printing instruction, the output apparatus 14 acquires from the document information of the print job a host name and an IP address of the client terminal 10A serving as a storing destination of the print job. The output apparatus 14 acquires from the client terminal 10A print job data by using the host name and the IP address of the client terminal 10A, and executes a print job to perform printing.

Further, the output apparatus 14 sends a print end report indicating that printing has finished to the client terminal 10B serving as the acquiring source of the print job list, and the client terminal 10A serving as the acquiring source of the print job data after the printing has been finished. The above-described process of the output apparatus 14 may be implemented by embedded applications.

The client terminal 10B that has received the print end report deletes the document information of the print job printing of which has been finished. Further, the client terminal 10A that has received the print end report deletes the print job data and the document information of the print job printing of which has been finished. The print end report may be a print job deleting request.

The information processing system 1 according to the first embodiment enables the output apparatus 14 to perform the proxy user printing even when the print job document information and print job data are stored in the client terminal 10. Accordingly, the information processing system 1 according to the first embodiment may be able to implement the proxy user printing without a server that stores the print job document information and print job data.

Note that the information processing system 1 of FIG. 1 is an example, and may be configured to include two or more user information management servers 12, or include an apparatus having respective functions of the user information management server 12 and the output apparatus 14.

Hardware Configuration

Figure 2:
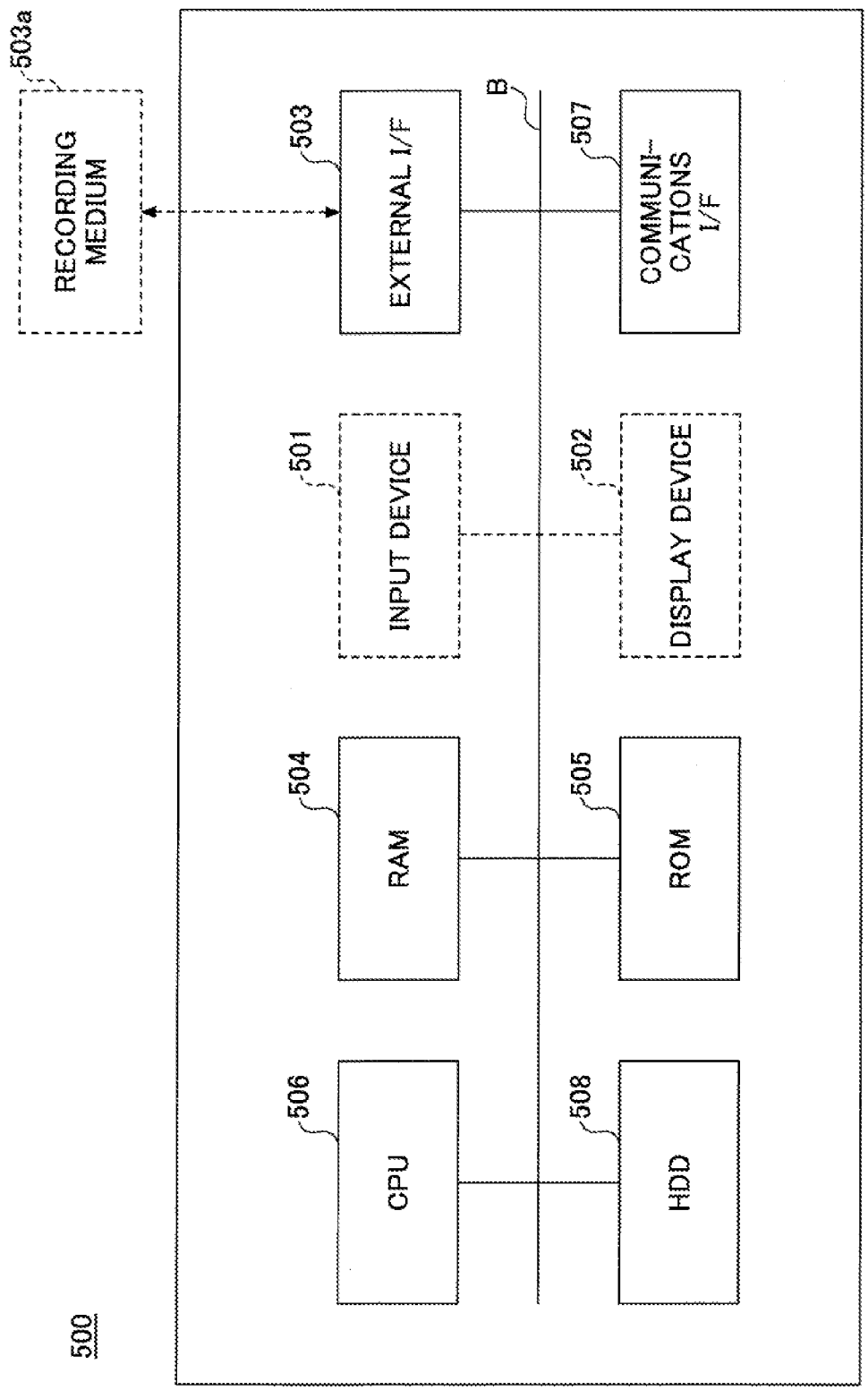
FIG. 2 is a hardware configuration diagram illustrating an example of a computer according to an embodiment.

The client terminal 10 and the user information management server 12 may be implemented by a computer or the like having a hardware configuration illustrated in FIG. 2. FIG. 2 is a hardware configuration diagram illustrating an example of the computer according to the embodiment.

The computer 500 illustrated in FIG. 2 includes an input device 501, a display device 502, an external I/F 503, a RAM 504, a ROM 505, a CPU 506, a communications I/F 507, an HDD 508, and the like that are connected to one another via a bus B. Note that the input device 501 and the display device 502 may optionally be connected to the computer 500 as required.

The input device 501 includes a keyboard, a mouse, and the like, and is configured to allow a user to input various operation signals. The display device 502 includes a display, and the like, and is configured to display results of processes performed by the computer 500.

The communications I/F 507 serves as an interface configured to connect the computer 500 to the network N1. With this configuration, the computer 500 may be able to perform data communications via the communications I/F 507.

The HDD 508 serves as a non-volatile storage device configured to store programs and data. Examples of the stored programs and data include an OS serving as basic software that is configured to control overall operations of the computer 500, application software that is configured to provide various types of functions on the OS, and the like.

The external I/F 503 serves as an interface with respect to external devices. Examples of the external devices include a recording medium 503a, and the like. Hence, the computer 500 may be able to read information from the recording medium 503a or write information on the recording medium 503a via the external I/F 503. Examples of the recording medium 503a include a flexible disk, a compact disk (CD), a digital versatile disk (DVD), a secure digital (SD) card, and a universal serial bus (USB) memory.

The ROM 505 is a non-volatile semiconductor memory (a storage device) configured to retain programs or data even when power supply is turned off. The ROM 505 is configured to store programs and data such as BIOS, OS settings, network settings, and the like that are executed at startup of the computer 500. The RAM 504 is a volatile semiconductor memory configured to temporarily store programs and data.

The CPU 506 is a processor configured to implement overall control operations or functions of the computer 500 by loading programs and data in the RAM 504 from a storage device such as the ROM 505 or the HDD 508 to execute processes in accordance with the loaded programs and data.

The client terminal 10 according to the embodiment may be able to implement various types of processes described later by the above-described hardware configuration of the computer 500.

Figure 3:
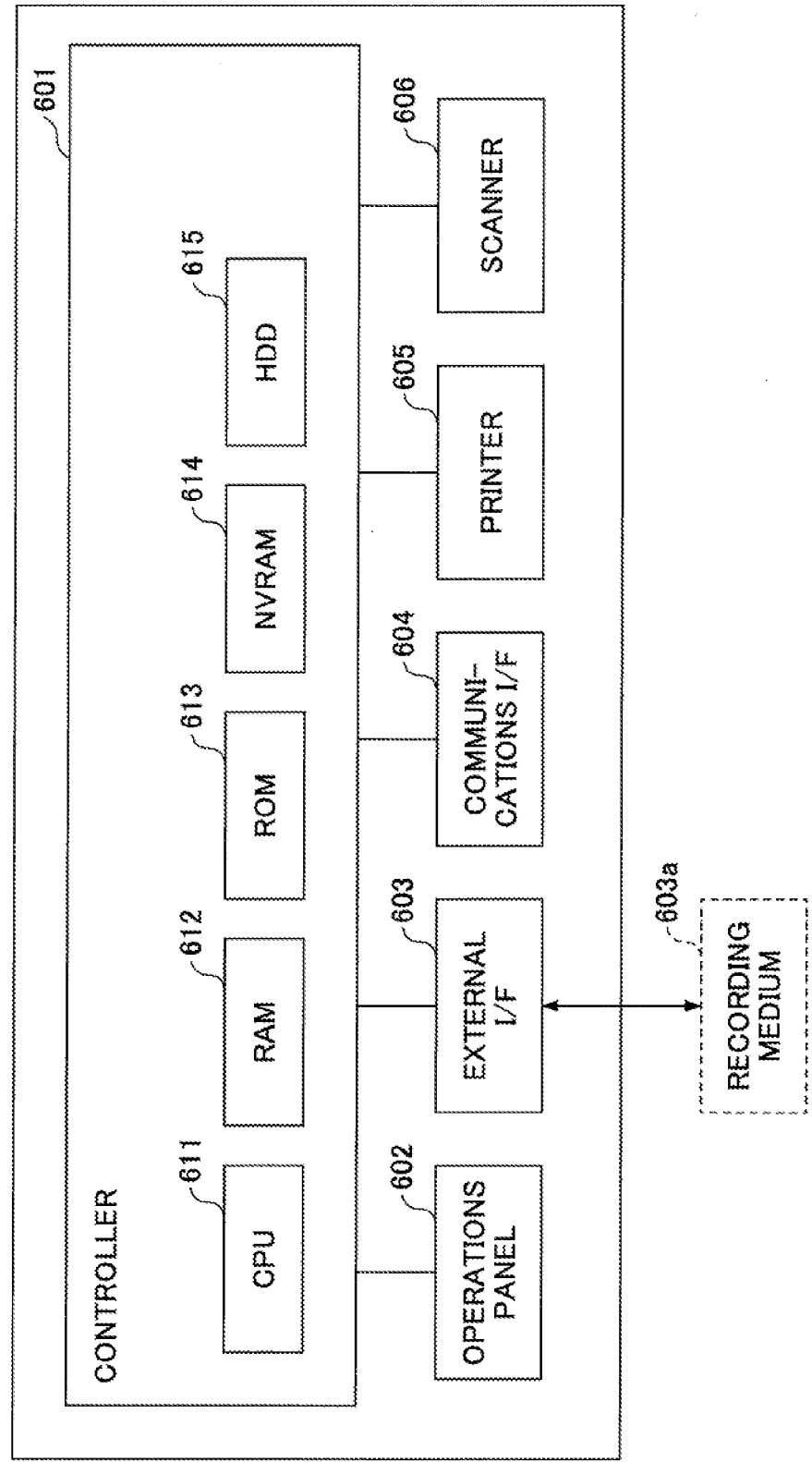
FIG. 3 is a hardware configuration diagram illustrating an example of an output apparatus according to an embodiment.

The output apparatus 14 illustrated in FIG. 1 may be implemented by a computer having a hardware configuration illustrated in FIG. 3, for example. FIG. 3 is a hardware configuration diagram illustrating an example of the output apparatus according to the embodiment. FIG. 3 illustrates a hardware configuration when the output apparatus 14 is a multifunctional peripheral.

The output apparatus 14 illustrated in FIG. 3 includes a controller 601, an operations panel 602, an external I/F 603, a communications I/F 604, a printer 605, and a scanner 606.

The controller 601 includes a CPU 611, a RAM 612, a ROM 613, a NVRAM 614, and an HDD 615. The ROM 613 is configured to store various types of programs and data. The RAM 612 is configured to temporarily store programs and data. The NVRAM 614 may, for example, store setting information and the like. Further, the HDD 615 is configured to store various types of programs and data.

The CPU 611 is configured to implement overall control operations or functions of the output apparatus 14 by loading programs, data, and setting information in the RAM 612 from a storage device such as the ROM 613, the NVRAM 614, and the HDD 615 to execute processes in accordance with the loaded programs, data, and setting information.

The operations panel 602 includes an input part configured to receive input from the user, and a display part configured to perform display. The external I/F 603 servers as an interface with respect to external devices. Examples of the external devices include a recording medium 603a, and the like. Hence, the output apparatus 14 may be able to read information from the recording medium 203a or write information on the recording medium 603a via the external I/F 603. Examples of the recording medium 603a include a flexible disk, a CD, a DVD, an SD card, and a USB memory.

The communications I/F 604 serves as an interface configured to connect the output apparatus 14 to the network N1. With this configuration, the output apparatus 14 may be able to perform data communications via the communications I/F 604. The printer 605 is a print apparatus configured to print the print data on sheets of paper. The scanner 606 is a reading apparatus configured to read image data (electronic data) from a document.

Software Configuration
Client Terminal

Figure 4:
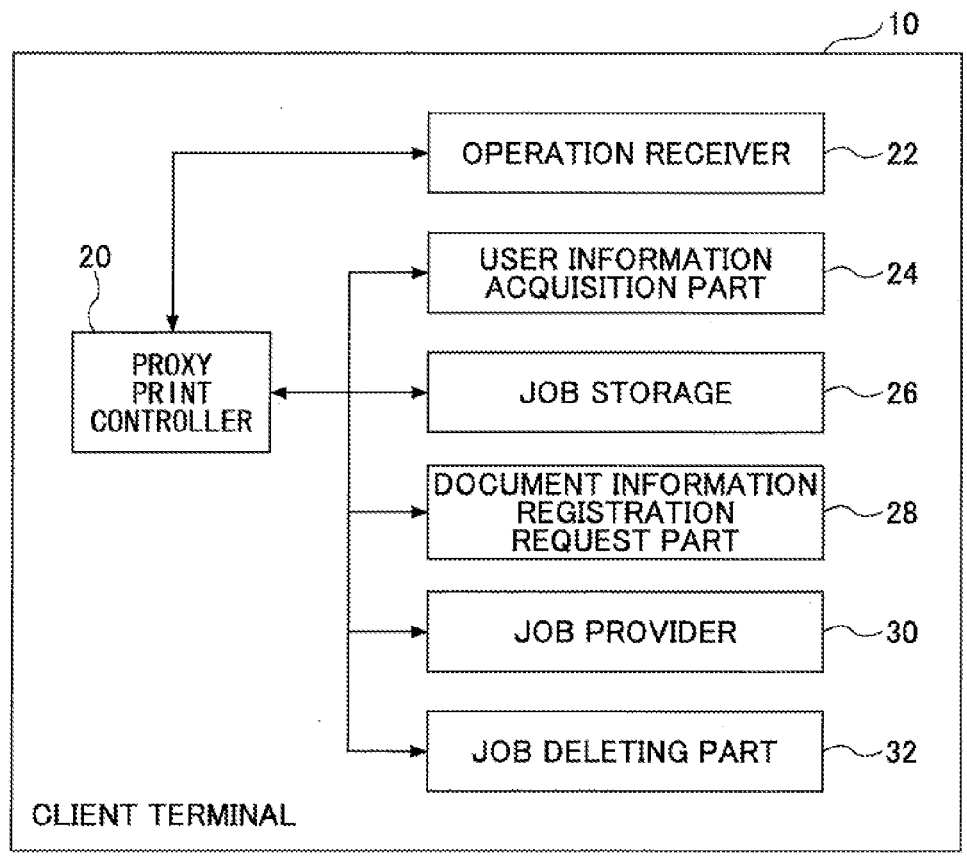
FIG. 4 is a process block diagram illustrating an example of a client terminal according to an embodiment.

The client terminal 10 according to the embodiment may be implemented, for example, by process blocks illustrated in FIG. 4. FIG. 4 is a process block diagram illustrating an example of the client terminal according to the embodiment.

The client terminal 10 is configured to implement a proxy print controller 20, an operation receiver 22, a user information acquisition part 24, a job storage 26, a document information registration request part 28, a job provider 30, and a job deleting part 32 by executing a program.

The proxy print controller 20 is configured to perform control associated with proxy user printing. The operation receiver 22 is configured to receive operations from the user. The user information acquisition part 24 is configured to acquire a host name and an IP address of the client terminal 10 corresponding to each user from the user information management server 12. The job storage 26 is configured to store document information and data of the print job. Note that the job storage 26 may include a document information storing part and a job data storing part.

The document information registration request part 28 is configured to transmit to the client terminal 10 of the proxy user a registration request to register the document information of the print job (also called "print job document information") by utilizing the host name or the IP address of the proxy user client terminal 10. The job provider 30 is configured to provide a print job list and the print job data based on the registering request received from the output apparatus 14. The job deleting part 32 is configured to delete the print job document information or the print job data stored in the job storage 26 based on a print job end report or a print job deleting request.

User Information Management Server

Figure 5:
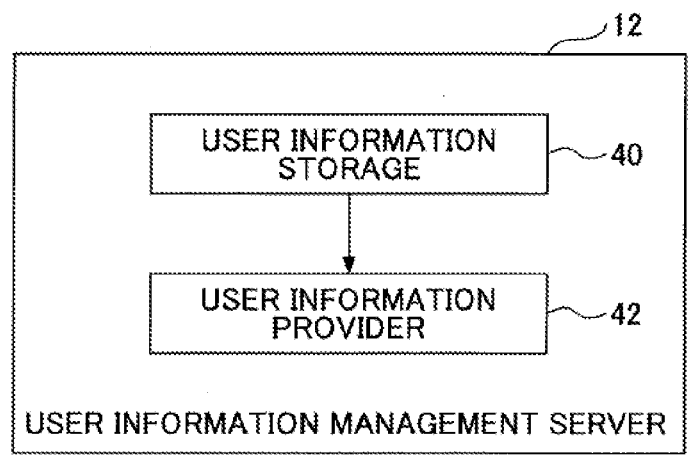
FIG. 5 is a process block diagram illustrating an example of a user information management server according to an embodiment.

The user information management server 12 according to the embodiment may be implemented, for example, by process blocks illustrated in FIG. 5. FIG. 5 is a process block diagram illustrating an example of the user information management server according to the embodiment.

The user information management server 12 is configured to implement a user information storage 40, and a user information provider 42 by executing a program. The user information storage 40 is configured to store a user ID of each user in association with a host name or the IP address of the client terminal 10.

The user information provider 42 is configured to provide the host name or the IP address of the client terminal 10 in association with the corresponding user based on the user information acquisition request from the client terminal 10. Further, the user information provider 42 is configured to provide the host name or the IP address of the client terminal 10 in association with the corresponding user based on the user information acquisition request from the output apparatus 14.

Output Apparatus

Figure 6:
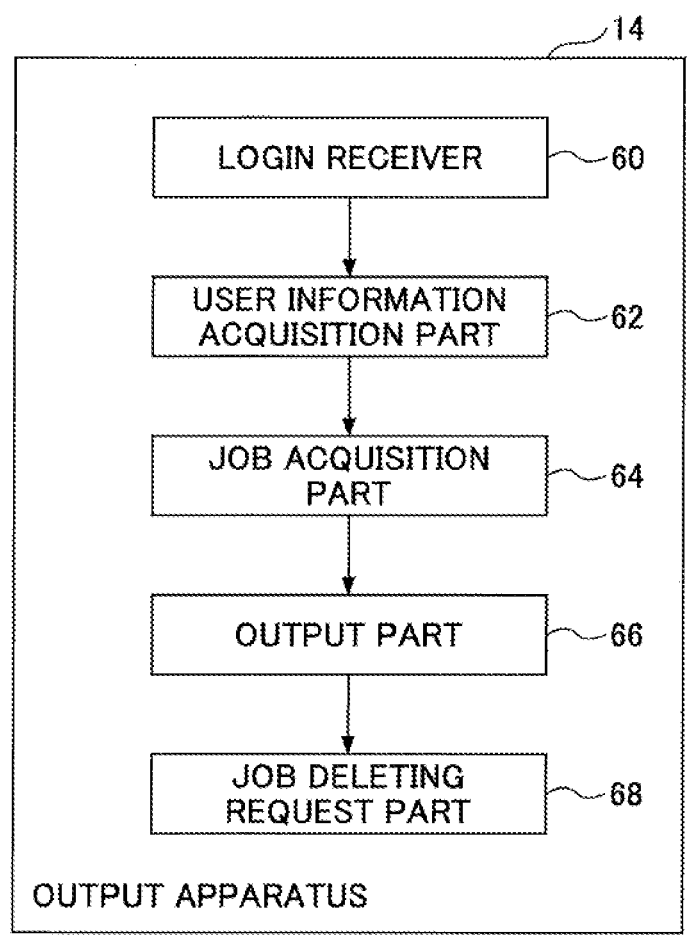
FIG. 6 is a process block diagram illustrating an example of the output apparatus according to the embodiment.

The output apparatus 14 according to the embodiment may be implemented, for example, by process blocks illustrated in FIG. 6. FIG. 6 is a process block diagram illustrating an example of the output apparatus according to the embodiment.

The output apparatus 14 is configured to implement a login receiver 60, a user information acquisition part 62, a job acquisition part 64, an output part 66, and a job deleting request 68 by executing a program. The login receiver 60 is configured to receive a login operation from the user. The user information acquisition part 62 is configured to acquire a host name and an IP address of the client terminal 10 in association with the login user from the user information management server 12. The job acquisition part 64 is configured to acquire a print job list from the client terminal 10 in association with the login user.

When a print job is selected from the print job list, the job acquisition part 64 specifies from the print job document information a client terminal 10 that saves print job data, and acquires the print job data from the specified client terminal 10. The output part 66 is configured to execute the print job to perform printing. The job deleting request 68 sends a print job deleting request to the client terminal 10 serving as the acquiring source of the print job list, and the client terminal 10 serving as the acquiring source of the print job data after the printing has been finished.

Details of Process

In the following, details of a process of the information processing system 1 according to the embodiment are described.

Process of Proxy User Printing

The information processing system 1 according to the embodiment may perform proxy user printing based on a process illustrated in FIG. 7, for example. FIG. 7 is a flowchart illustrating an example of the process of proxy user printing.

In step S11, the manager or the like registers user information including a client address (e.g., a host name or an IP address of the client terminal 10 of each user) in association with user identification information (e.g., a user ID) in the user information management server 12 as illustrated in FIG. 8.

FIG. 8 is a configuration diagram illustrating an example of user information registered in the user information management server. The user information illustrated in FIG. 8 may be registered by associating each of user IDs and a corresponding one of client addresses. Note that the user ID is an example of the user identification information such as a user name or the like that may be capable of identifying each user. Further, the client address may be a host name, an IP address, or the like that may serve as information for connecting to the client terminal 10.

In step S12, a user (owner) who registers the print jobs may need to register one or more user candidates (proxy users) who can execute the registered print jobs on behalf of the owner selected, for example, from a proxy user print setting screen illustrated in FIG. 9 in order to utilize a proxy user printing system.

FIG. 9 is an image diagram illustrating an example of the proxy user print setting screen. In the proxy user print setting screen 1000 illustrated in FIG. 9, a proxy user candidate may be selected from two or more users represented by login user names. When the proxy user candidate is set, the client terminal 10 acquires from the user information management server 12 a client address such as the host name or the IP address of the client terminal 10 of the user, who is registered as a proxy user candidate in the user information management server 12. Note that in the following illustration, a user A who is an owner is assumed to set a user B as the proxy user candidate.

In step S13, the user A, the owner, may specify the user B as a proxy user from the proxy user candidates for using the proxy user printing, and execute proxy user printing instructions. In this step, the client terminal 10A of the user A may query the user information management server 12 to verify whether the host name or the IP address of the client terminal 10B has been updated.

Then, the client terminal 10A saves document information and data of the print job in the client terminal 10A of the owner, and registers the document information of the print job in the client terminal 10B of the proxy user. Note that detailed description of the job registering process in step S13 will be described later.

In step S14, the user B specified as the proxy user by the user A logs into the output apparatus 14. The output apparatus 14 acquires the client address of the client terminal 10B of the login user B from the user information management server 12. Then, the output apparatus 14 acquires the print job list from the client terminal 10B. Note that the print job list registered in the client terminal 10B includes the print job for which the proxy user printing request is received by the user A.

When the user B selects via the operations panel 602 the print job the proxy user printing of which is requested by the user A, and executes a printing instruction, the output apparatus 14 acquires from the document information of the print job a client address of the client terminal 10A serving as a storing destination of the print job. The output apparatus 14 acquires from the client terminal 10A print job data by using the client address of the client terminal 10A, and executes a print job to perform printing. Moreover, the output apparatus 14 deletes the document information and data of the print job printing of which has been finished from the client terminals 10A and 10B after the printing has been finished. Note that detailed description of the job printing process in step S14 will be described later.

Job Registering Process

FIG. 10 is a sequence diagram illustrating an example of a job registering process. In step S21, the user A, the owner, may, for example, instruct the client terminal 10A to specify the user B from the proxy user candidates as a proxy user to execute the proxy user printing.

In step S22, the client terminal 10A sends to the user information management server 12 an inquiry about the client address of the client terminal 10B of the user B specified as the proxy user from the user A, and verifies whether the client address of the client terminal 10B has been updated. Note that the process of step S22 is not necessarily performed at this timing.

In step S23, the client terminal 10A saves the print job document information and print job data in the own terminal (i.e., the client terminal 10A). Further, in step S24, the client terminal 10A causes the client terminal 10B to register the print job document information by using the client address of the client terminal 10B.

Figure 11A:
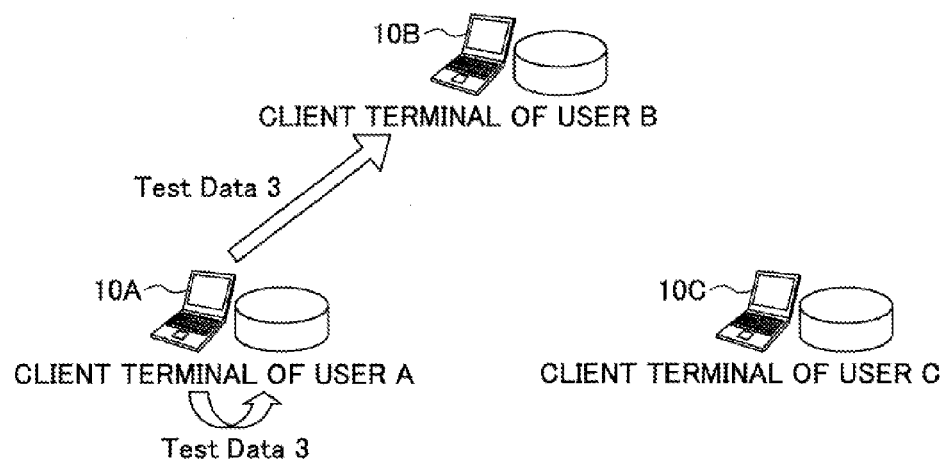
FIGS. 11A to 11C are image diagrams illustrating examples of the job registering process.
Figure 11B:
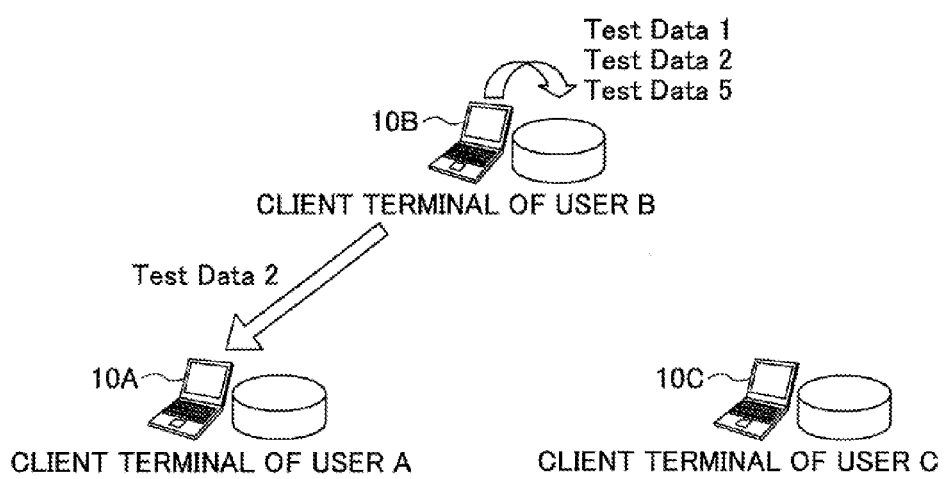
Figure 11C:
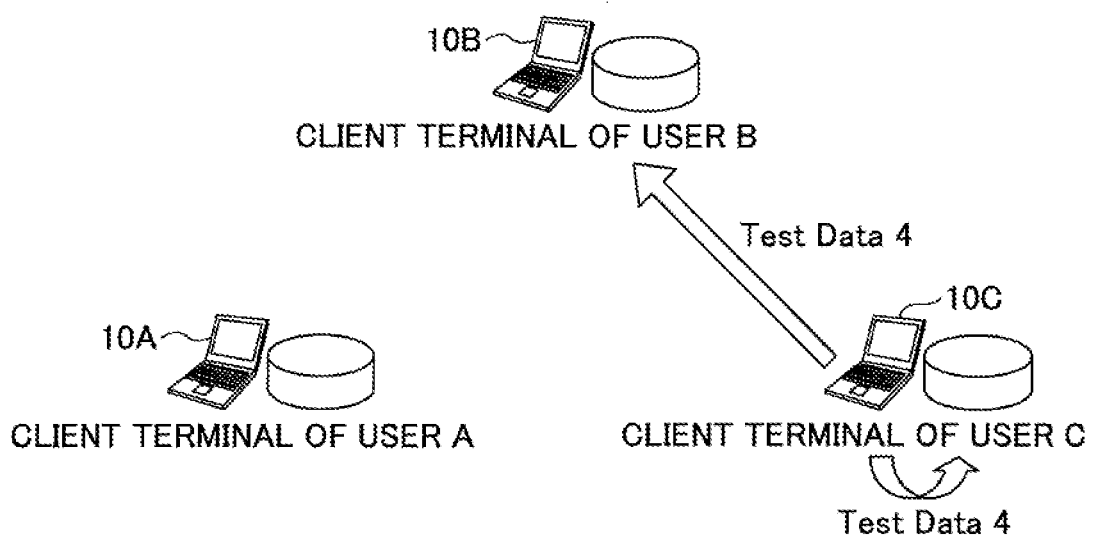

Note that in the following, a further description is given of the job registering process by using a specific example. FIGS. 11A to 11C are image diagrams illustrating examples of the job registering process. In FIGS. 11A to 11C, the client terminal 10A for the user A, the client terminal 10B for the user B, and a client terminal 10C for a user C are illustrated as examples.

FIG. 11A illustrates an example of the job registering process in which the user A specifies the user B as the proxy user to execute proxy user printing "Test Data 3". The client terminal 10A saves the print job document information and print job data of the "Test Data 3" in own terminal (i.e., the client terminal 10A). Further, the client terminal 10A for the user A causes the client terminal 10B of the user B to register the print job document information and print job data of the "Test Data 3".

FIG. 11B illustrates an example of the job registering process in which the user B specifies the user A as the proxy user to execute proxy user printing "Test Data 2". The client terminal 10B for the user B saves the print job document information and print job data of the "Test Data 2" in own terminal (i.e., the client terminal 10B). Further, the client terminal 10B for the user B causes the client terminal 10A of the user A to register the print job document information and print job data of the "Test Data 2". Note that FIG. 11B also illustrates examples of the user B executing printing instructions for "Test Data 1" and "Test Data 5".

FIG. 11C illustrates an example of the job registering process in which the user C specifies the user B as the proxy user to execute proxy user printing "Test Data 4". The client terminal 10C for the user C saves the print job document information and print job data of the "Test Data 4" in own terminal (i.e., the client terminal 10C). Further, the client terminal 10C for the user C causes the client terminal 10B of the user B to register the print job document information and print job data of the "Test Data 4".

With the job registering process of FIG. 11, the client terminals 10A, 10Bm and 10C may save the print job document information illustrated in FIGS. 12 to 14, for example. FIGS. 12 to 14 are configuration diagrams illustrating examples of print job document information. FIG. 12 illustrates an example of the print job document information stored in the client terminal 10A. FIG. 13 illustrates an example of the print job document information stored in the client terminal 10B. FIG. 14 illustrates an example of the print job document information stored in the client terminal 10C.

The print job document information illustrated in FIGS. 12 to 14 have the setting of "delegation_user" for the user ID of the user who the owner has requested to execute the proxy user printing. For example, referring to FIG. 12, the document information of "id1" indicates the document information of a job for which the user B has requested the user A to execute the proxy user printing. Further, in FIG. 12, the document information of "id2" indicates the document information of a job for which the user A has requested the user B to execute the proxy user printing.

In addition, referring to FIG. 13, the document information of "id2" indicates the document information of a job for which the user B has requested the user A to execute the proxy user printing. Further, in FIG. 13, the document information of "id3" indicates the document information of a job for which the user A has requested the user B to execute the proxy user printing. Moreover, in FIG. 13, the document information of "id4" indicates the document information of a job for which a user C has requested the user B to execute the proxy user printing. Further, referring to FIG. 14, the document information of "id1" indicates the document information of a job for which the user C has requested the user B to execute the proxy user printing.

In the document information of the print jobs illustrated in FIGS. 12 to 14, the users who have transmitted a request of the proxy user printing have the settings of their user IDs in the "user_id", and the users who have received the request of the proxy user printing have the settings of their user IDs in the "delegation_user". The information processing system 1 according to the first embodiment may be able to perform accounting for the user who has transmitted the request of the proxy user printing by applying the user ID set in the "user_id" to the accounting.

Further, in the information processing system 1 according to the first embodiment, the user ID in association with an own terminal that is set in the "delegation_user" indicates that the print job is subject to the proxy user printing requested by another user.

Job Printing Process

Figure 15:
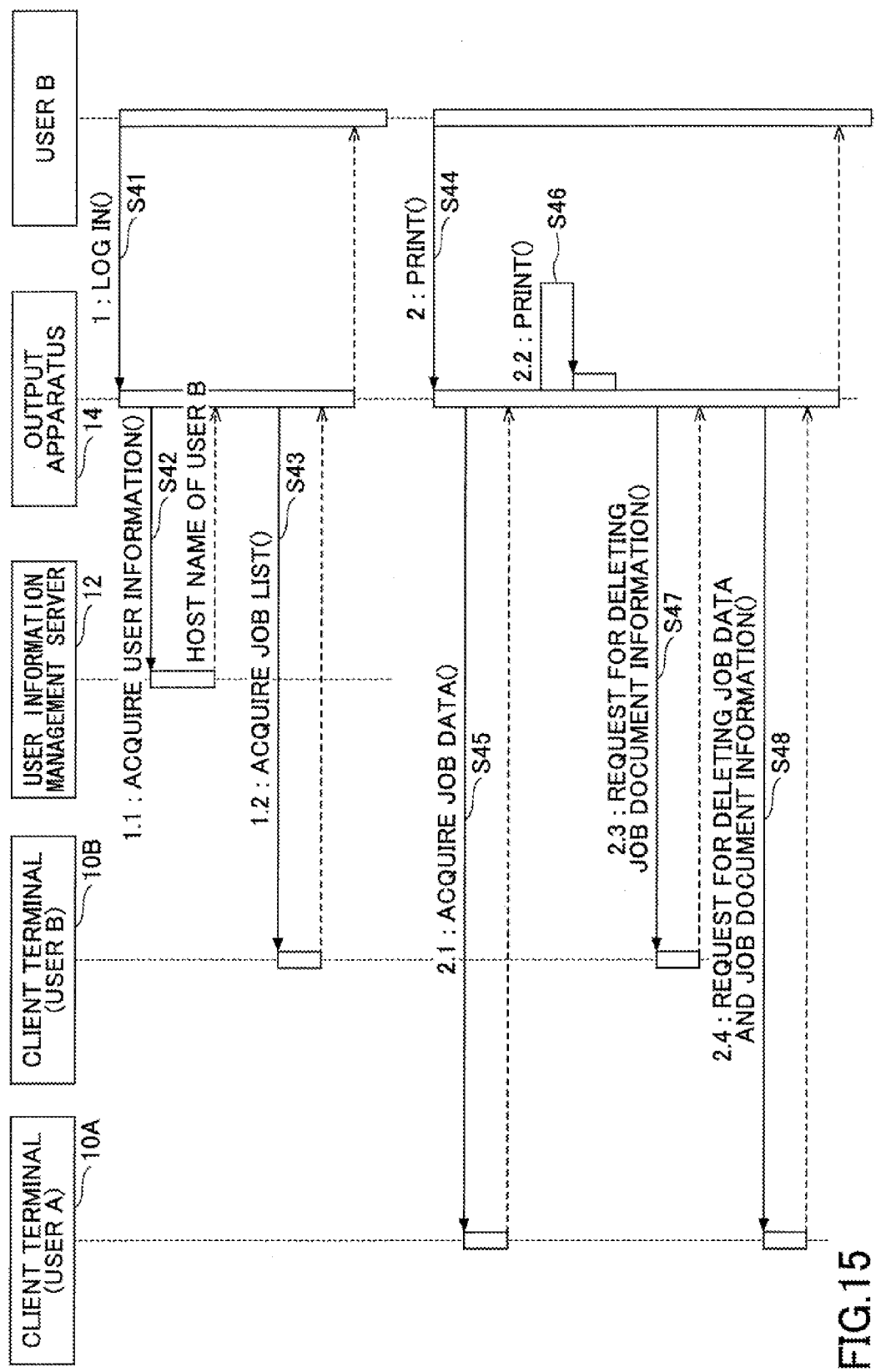
FIG. 15 is a sequence diagram illustrating an example of a job printing process.

FIG. 15 is a sequence diagram illustrating an example of a job printing process. In step S41, the user B who is specified as a proxy user from the user A may log into the output apparatus 14 by inputting the user ID and password, for example. Note that the user ID and password are merely examples of information that identifies a user, and such information may be any information that identifies a user.

In step S42, the output apparatus 14 acquires a host name of the client terminal 10B from the user identification management server by specifying the user ID of the user B who has logged into the output apparatus 14. The host name is an example of a client address.

In step S43, the output apparatus 14 connects to the client terminal 10B by using the host name of the client terminal 10B to acquire a print job list. Note that the print job list may be created by the document information of the print job stored in the client terminal 10B. Further, the print job list acquired from the client terminal 10B includes information about storing destinations of the print jobs. The output apparatus 14 displays the acquired print job list on the operations panel 602.

In step S44, the user B selects on the operations panel 602 the print job the proxy user printing of which is requested by the user A, and executes a print instruction for the selected print job. In step S45, the output apparatus 14 acquires a host name of the client terminal 10A serving as a storing destination of the print job from the document information of the selected print job.

In step S45, the output apparatus 14 acquires print job data from the client terminal 10A by using the host name of the client terminal 10A. In step S46, the output apparatus 14 executes the acquired print job to perform printing the print job data.

When printing is finished, the output apparatus 14 transmits a deleting request to delete the document information of the printed print job to the client terminal 10B in step S47 to delete the document information of the printed print job from the client terminal 10B.

Further, when printing is finished, the output apparatus 14 transmits a deleting request to delete the document information of the printed print job and the print job data in step S48 to the client terminal 10A to delete the document information of the printed print job and the print job data from the client terminal 10A.

Note that in step S48, whether to transmit a deleting request to delete the document information of the print job and the print job data to client terminals other than the login client terminal 10B may, for example, be determined based on whether the print job is subject to proxy user printing. When the print job is subject to proxy user printing, the print job data are stored outside the client terminal 10B. Hence, the output apparatus 14 determines to transmit the deleting request to delete the document information of the print job and the print job data to the client terminals other than the client terminal 10 of the login user. Alternatively, the output apparatus 14 may transmit the deleting request to delete the document information of the print job and the print job data to the client terminal 10 that has acquired the print job data, instead of transmitting the deleting request to the client terminal having the print job subject to the proxy user printing.

In the example of the document information of the print job illustrated in FIG. 13, the output apparatus 14 displays a print job list screen 1100 illustrated in FIG. 16 on the operations panel 602. FIG. 16 is an image diagram illustrating an example of a print job list displayed on the operations panel 602.

The print job list screen 1100 of FIG. 16 includes the document of information 1101 of the print job "Test Data 3" the proxy user printing of which is requested by the user A. Moreover, the print job list screen 1100 of FIG. 16 includes the document of information 1102 of the print job "Test Data 4" the proxy user printing of which is requested by the user C.

Outline

The information processing system 1 according to the first embodiment enables the output apparatus to perform the proxy user printing even when the print job document information and print job data are stored in a local client terminal 10. Accordingly, the information processing system 1 according to the first embodiment may be able to implement the proxy user printing without a print server that stores the print job document information and print job data.

Second Embodiment

The first embodiment is based on the assumption in which the document information of the print job and the print job data are stored in the local client terminals 10. An information processing system 1a according to a second embodiment described below is based on the assumption in which there is set a server configured to store the document information of print jobs and print job data, and the server stores the print job document information and the print job data; however, when there is no server configured to store the document information of print jobs and print job data, the client terminal 10 stores the print job document information and the print job data. Note that the second embodiment is partially similar to the first embodiment; hence, a duplicated illustration is omitted from the specification.

Figure 17:
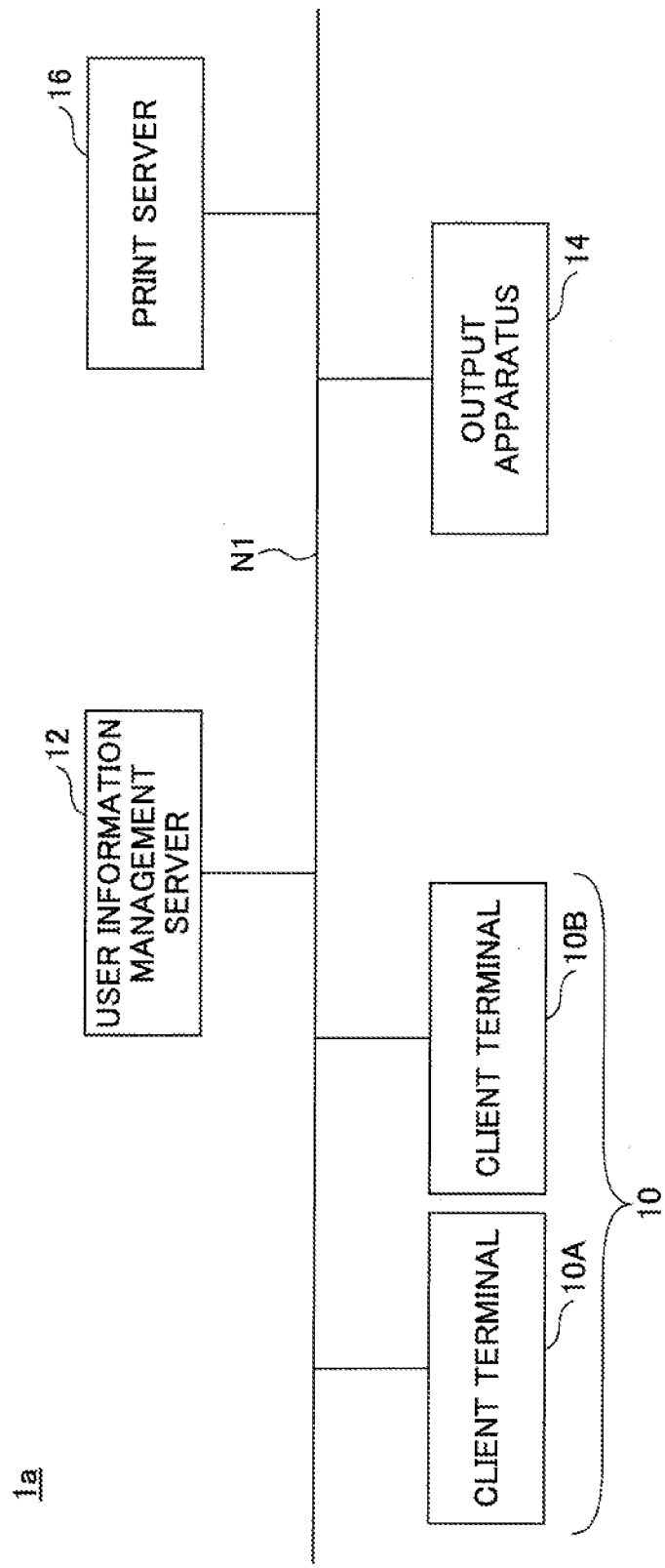
FIG. 17 is a configuration diagram illustrating another example of the information processing system according to the embodiment.

FIG. 17 is a configuration diagram illustrating another example of an information processing system according to the second embodiment. The information processing system 1a of FIG. 17 has a configuration of the information processing apparatus 1 of FIG. 1 to which a print server 16 is added. The print server 16 is an example of a server that stores document information of the print job and print job data.

Figure 18:
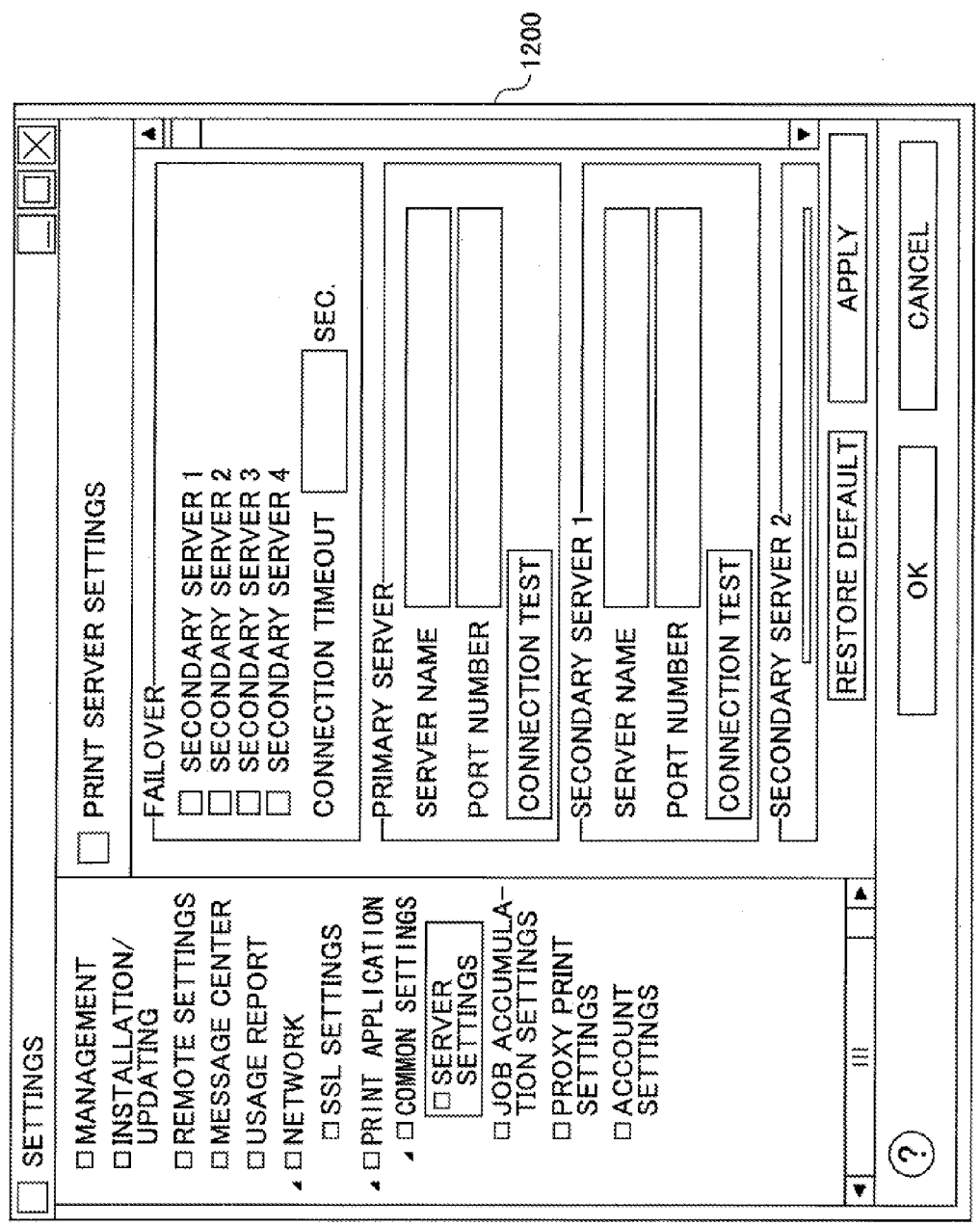
FIG. 18 is an image diagram illustrating an example of a server setting screen.

In the information processing system 1a, when the print job document information and the print job data are stored in the print server 16, a manager or the like is set the print server 16 used for storing the print job document information and the print job data via a server setting screen 1200. FIG. 18 is an image diagram illustrating an example of the server setting screen 1200.

The server setting screen 1200 of FIG. 18 is used for setting in each of the client terminals 10 the print server 16 used for storing the print job document information and the print job data. The manager or the like may set the print server 16, for example, via the server setting screen of FIG. 18 in the client terminals 10 that cause the print server 16 to store the print job document information and the print job data.

Figure 19:
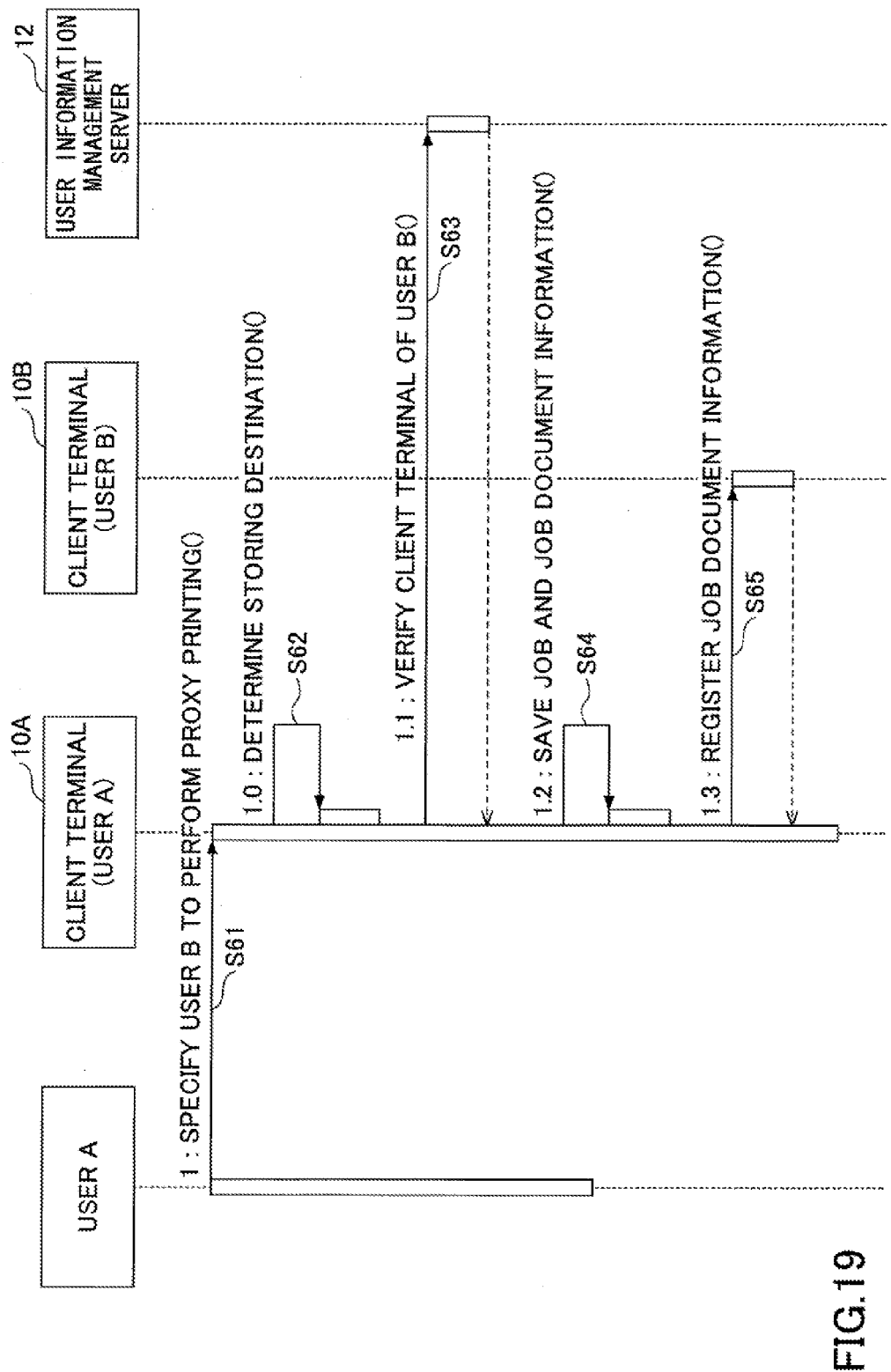
FIG. 19 is a sequence diagram illustrating another example of the job registering process.

FIG. 19 is a sequence diagram illustrating another example of the job registering process. In step S61, the user A, the owner, may, for example, instruct the client terminal 10A to specify the user B from the proxy user candidates as a proxy user to execute the proxy user printing.

Figure 21:
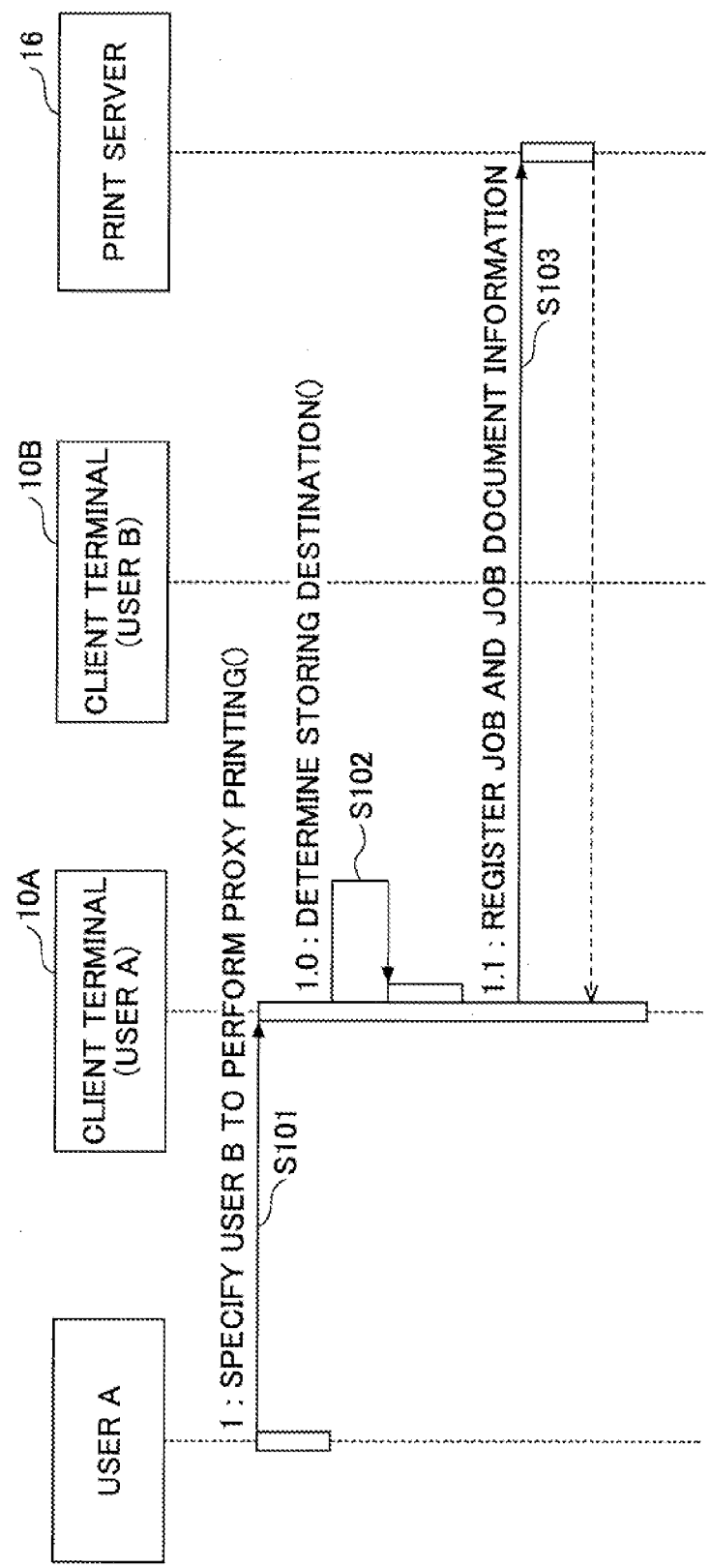
FIG. 21 is a sequence diagram illustrating an example of a job registering process of storing print job document information and print job data in a print server.

In step S62, the client terminal 10A determines a storing destination of the print job document information and the print job data based on whether there is set the print server 16 by following the process illustrated in FIG. 21.

Figure 20:
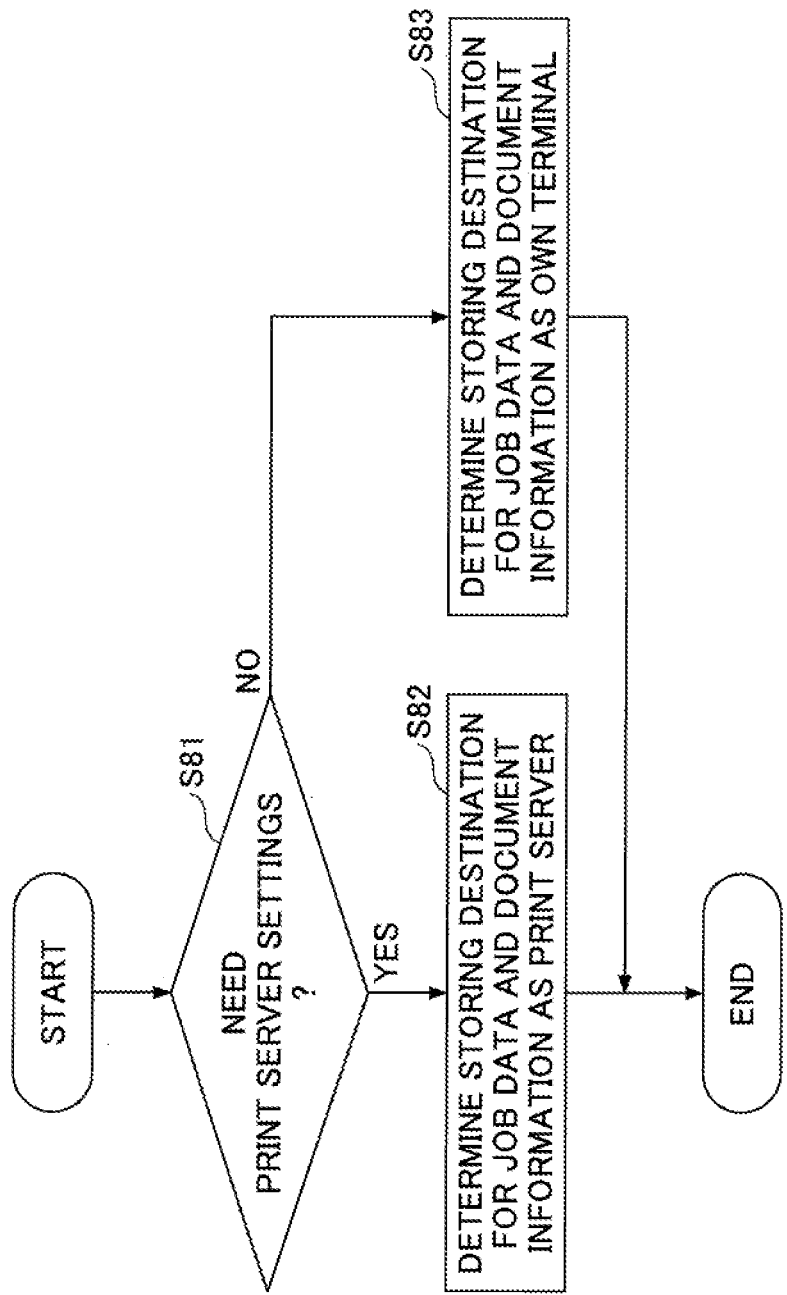
FIG. 20 is a flowchart illustrating an example of a process of determining a storing destination of print job document information and print job data.

FIG. 20 is a flowchart illustrating an example of a process of determining a storing destination of the print job document information and print job data. In step S81, the client terminal 10A determines whether there is set the print server 16. When the print server 16 is set, the client terminal 10A proceeds with step S82 to determine a storing destination of the document information of the print job and the print job data as the print server 16.

On the other hand, when the print server 16 is not set, the client terminal 10A proceeds with step S83 to determine the storing destination of the document information of the print job and the print job data as the client terminal 10A of the own terminal. According to the process of determining the storing destination illustrated above, each of the client terminals 10 may perform proxy user printing by following the process of the first embodiment when the corresponding client 10 does not set the print server 16.

Note that steps subsequent to step S63 of the sequence diagram of FIG. 19 illustrate a case where the storing destination of the document information of the print job and the print job data is determined as the own terminal, which are similar to steps subsequent to step S22 of FIG. 10. Hence, a duplicated description is omitted from the specification.

Further, the job registering process of a case in which the storing destination of the document information of the print job and the print job data is determined as the print server 16 is illustrated in FIG. 21. FIG. 21 is a sequence diagram illustrating an example of a job registering process of storing the print job document information and print job data in a print server.

In step S101, the user A, the owner, may, for example, instruct the client terminal 10A to specify the user B from the proxy user candidates as a proxy user to execute the proxy user printing.

In step S102, the client terminal 10A determines a storage destination of the print job document information and the print job data based on whether there is set the print server 16 by following the process illustrated in FIG. 20. Subsequently, the client terminal 10A determines that the storing destination of the print job document information and the print job data is the print server 16.

In step S103, the client terminal 10A registers the print job document information and the print job data in the set print server 16. According to the sequence diagram of FIG. 21, when the print server 16 is set in each of the client terminals 10, the client terminal 10 registers the print job document information and the print job data in the print server 16, and performs the proxy user printing.

Figure 22:
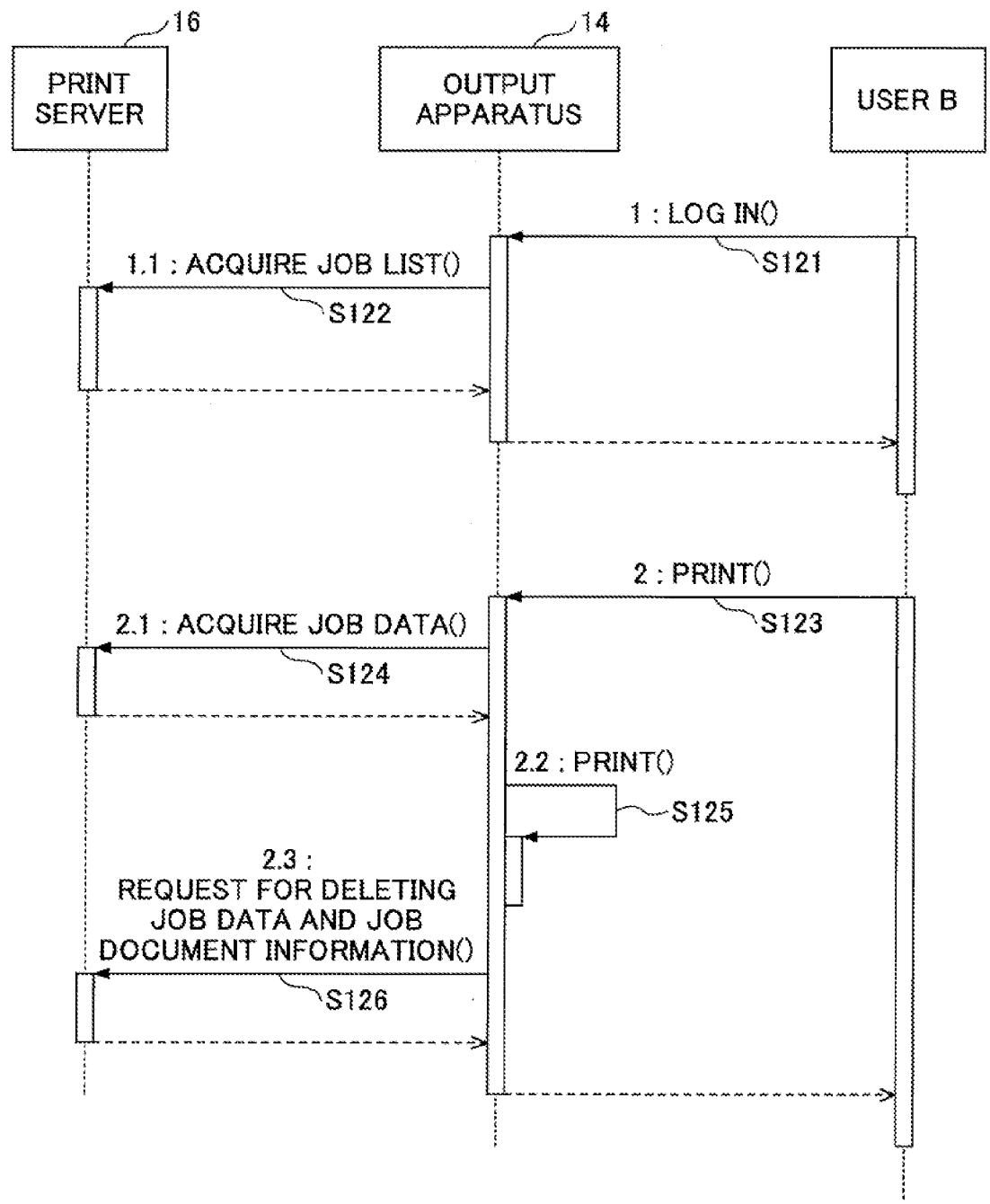
FIG. 22 is a sequence diagram illustrating an example of a job printing process of printing the document information of the print job and data stored in the print server.

Note that FIG. 22 illustrates a job printing process of a case where the print job document information and the print job data are registered in the print server 16. FIG. 22 is a sequence diagram illustrating an example of a job printing process of the case where the printing the print job document information and data are stored in the print server 16.

In step S121, the user B who is specified as a proxy user from the user A may log into the output apparatus 14 by inputting the user ID and password, for example. In step S122, the output apparatus 14 specifies the user ID of the login user B to acquire a print job list from the print server 16. The output apparatus 14 displays the acquired print job list on the operations panel 602.

In step S123, the user B selects on the operations panel 602 the print job the proxy user printing of which is requested by the user A, and executes a print instruction for the selected print job. In step S124, the output apparatus 14 acquires the print job data from the print server 16. In step S125, the output apparatus 14 executes the acquired print job to perform printing the print job data. When printing is finished, the output apparatus 14 transmits the deleting request to delete the document information of the printed print job and the print job data in step S126 to the print server 16 to delete the document information of the printed print job and the print job data from the print server 16.

Outline

In the information processing system 1a according to the second embodiment, when there is a server set for storing the print job document data and the print job data, the print job document data and the print job data may be stored in the server set to perform the proxy user printing.

Further, in the information processing system 1a according to the second embodiment, when there is no server set for storing the print job document data and the print job data, the print job document data and the print job data may be stored in the client terminal 10 to perform the proxy user printing.

Third Embodiment

The information processing system 1a of the second embodiment may store the print job document information and the print job data in the server when the server is set for storing the print job document information and the print job data. An information processing system of a third embodiment may allow a user to select the storing destination for storing the print job document information and the print job data in the server when the server is for storing the print job document information and the print job data. Note that the third embodiment is partially similar to the second embodiment; hence, a duplicated illustration is omitted from the specification.

Figure 23:
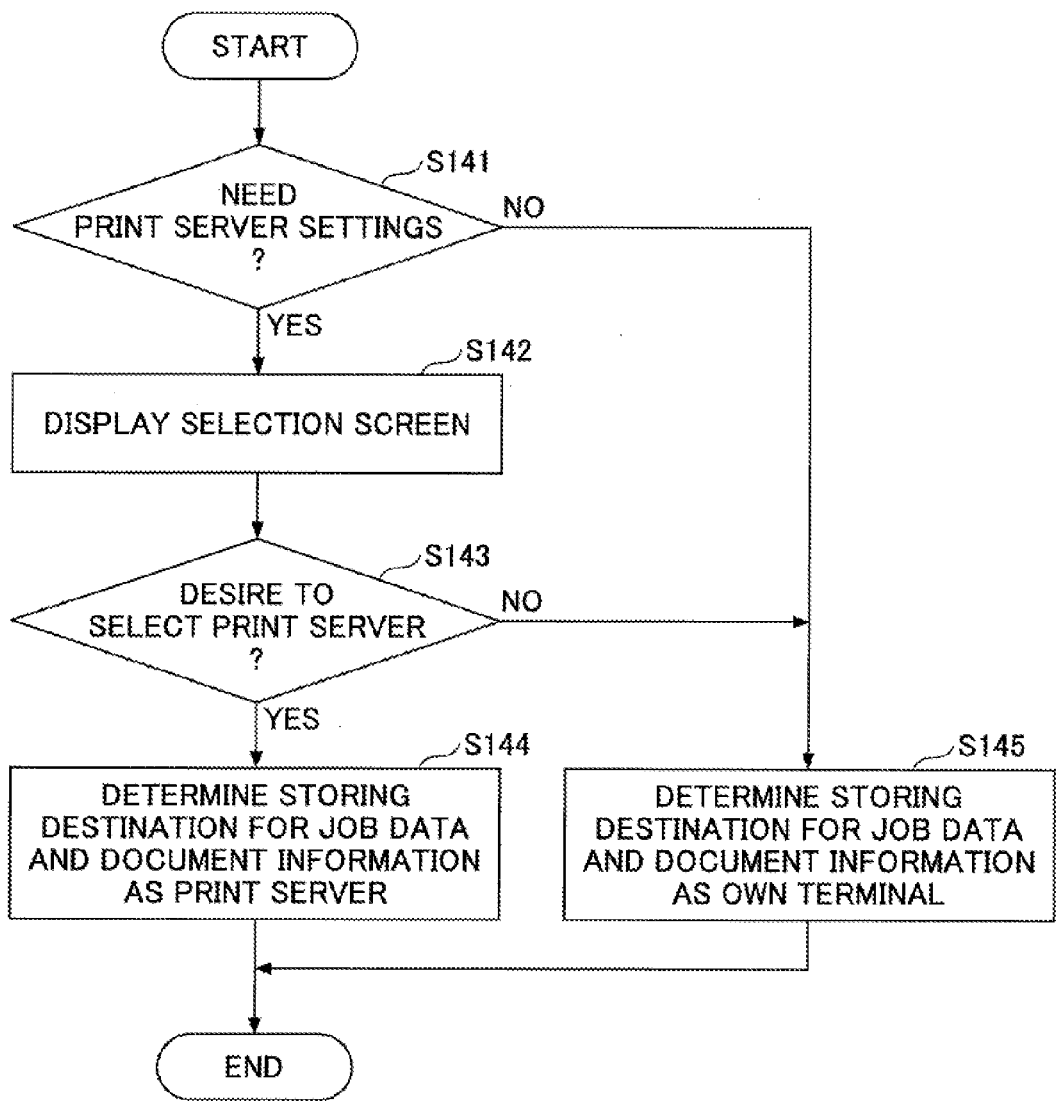
FIG. 23 is a flowchart illustrating another example of the process of determining a storing destination of print job document information and print job data.

In the information processing system according to the third embodiment, in step S62 of FIG. 19, the client terminal 10A determines a storing destination of the print job document information and the print job data by following a process illustrated in FIG. 23.

FIG. 23 is a flowchart illustrating another example of the process of determining a storing destination of the print job document information and the print job data. In step S141, the client terminal 10A determines whether there is set the print server 16. When there is set the print server 16, the client terminal 10A proceeds with step S142 to display a storing destination selection screen 1300 illustrated in FIG. 24 so as to allow the user A of the owner to select the storing destination of the print job document information and the print job data.

Figure 24:
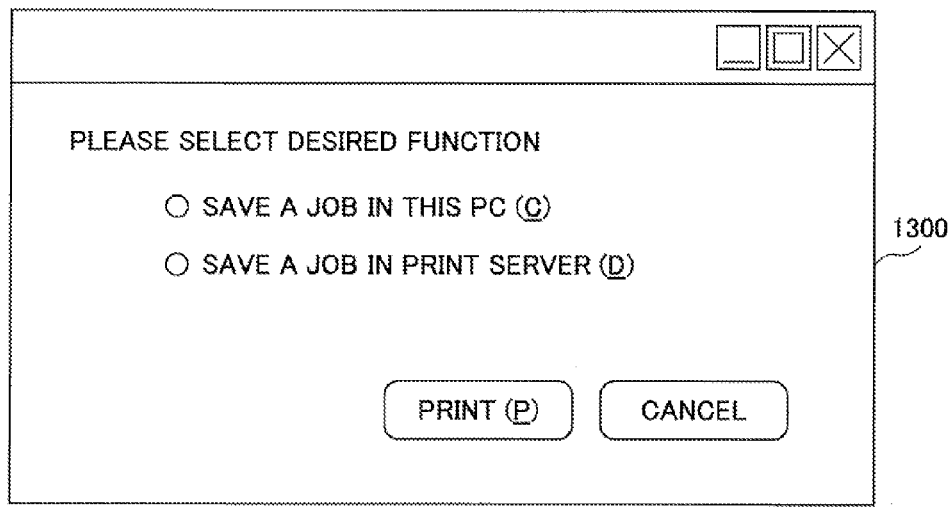
FIG. 24 is an image diagram illustrating an example of a storing destination.

FIG. 24 is an image diagram illustrating an example of the storing destination selection screen 1300. In the storing destination selection screen 1300 of FIG. 24, the client terminal 10A of the own terminal is selected as the storing destination of the print job document information and the print job data by selecting "save a job in this PC". Further, in the storing destination selection screen 1300 of FIG. 24, the print server 16 is selected as the storing destination of the print job document information and the print job data by selecting "save a job in the print server".

When the user A selects the print server 16 as the storing destination of the print job document information and the print job data, the client terminal 10A proceeds with step S144 to determine the print server 16 as the storing destination of the print job document information and the print job data. On the other hand, when the user A selects the client terminal 10A as the storing destination of the print job document information and the print job data, the client terminal 10A proceeds with step S145 to determine the client terminal 10A of the own terminal as the storing destination of the print job document information and the print job data.

Further, when there is no setting in the print server 16 in step S141, the client terminal 10A proceeds with step S145 to determine the storing destination of the document information of the print job and the print job data as the client terminal 10A of the own terminal.

According to the storing destination determining process of FIG. 23, each of the client terminals 10 may be able to perform the proxy user printing by following the process of the first embodiment when the printer server 16 is not set, and when the client terminal 10A is selected as the storing destination of the document information of the print job and the print job data.

Note that in the first to the third embodiments, when the user ID is set in association with two or more client terminals 10, the print job document information may be registered in the two or more client terminals 10. With such a configuration, the print job list is not necessarily obtained from all the client terminals 10 in association with the login user, but may be obtained from any one of the client terminals 10 in association with the login user in the first to the third embodiments.

Accordingly, a load on the network may be suppressed by registering the print job in the set client terminals 10. Further, when the two or more client terminals 10 are set in association with one user, there is a failover relationship between the client terminals 10. Accordingly, the print job list may be more likely to be obtained by connecting to the second one, the third one, or the like of the client terminals 10 when one of the client terminals 10 is not activated.

In addition, when the user A requests the user B to perform the proxy user printing, and the user B is set in association with the two or more client terminals 10, the document information of the print job may be registered in the two or more client terminals 10.

With such a configuration, the output apparatus 14 may acquire the print job document information by connecting to any one of the client terminals 10 that are in association with the user B in the first to the third embodiments. Moreover, there is a failover relationship between the client terminals 10 in association with the user B. Accordingly, the print job list may be more likely to be obtained by connecting to the second one, the third one, or the like of the client terminals 10 when one of the client terminals 10 is not activated.

Further, in the first to the third embodiments, when the user ID is set in association with two or more client terminals 10, the print job document information may be registered in a representative client terminal 10. With such a configuration, a network load at the registration of the print job document information may be reduced.

Hence, when the user B logs into the output apparatus 14, the output apparatus 14 may acquire the print job document information from the two or more client terminals 10 to display the merged print job document information obtained from the two or more client terminals 10. The output apparatus 14 may hide (non-display) the print job or gray-out display the print job stored in the inactivated client terminal 10.

Note that the document information of the print job is not necessarily stored in the client terminal 10A of the user A who has transmitted the proxy user printing request. With such a configuration, the print job that is allowed one or more proxy users to perform proxy user printing may be prevented from being erroneously performed by the terminal of the user who has requested the one or more proxy users to perform proxy user printing.

The present invention is not limited to examples or embodiments disclosed above. Various modifications or alteration may be made without departing from the scope of the claims of the present invention. For example, the client terminal 10 is an example of a terminal apparatus. The operation receiver 22 is an example of a proxy output request receiver unit.

The user information acquisition part 24 is an example of a connecting information acquisition unit. The user information management server 12 is an example of a management apparatus. The job storage 26 is an example of a storing unit. The document information registration request part 28 is an example of a document information registration request unit. The job provider 30 is an example of a data provider unit. The job deleting part 32 is an example of a deleting unit.

Further, the job storage 26 is an example of a data storing unit and a document information storing unit. The job provider 30 is an example of a document information provider unit. The job acquisition part 64 is an example of a data acquiring unit. The output part 66 is an example of an output unit. The owner is an example of a request user. The print server 16 is an example of a storing apparatus.

According to the above-described embodiments, even when a terminal apparatus registers the document information of the proxy output, the proxy output may be achieved.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The present invention is not limited to the specifically disclosed embodiments, and variations and modifications may be made without departing from the scope of the present invention.

The present application is based on and claims the benefit of Japanese Priority Application No. 2015-000919 filed on Jan. 6, 2015, the entire contents of which are hereby incorporated herein by reference.

What is claimed is:

1. A terminal apparatus connected to another terminal apparatus and an output apparatus via a network, the terminal apparatus comprising a processor and being configured by software execution by the processor to perform a method comprising:
   receiving a proxy output request delegating output of data at the output apparatus to a proxy user, the proxy user being designated by a requesting user sending the proxy output request;
   acquiring information for connecting to the other terminal apparatus in association with the proxy user designated by the requesting user, from a management apparatus configured to manage the information for connecting to the other terminal apparatus in association with the proxy user;
   storing the data to be output at the output apparatus in response to receiving the proxy output request;
   transmitting, based on the acquired information, to the other terminal apparatus document metadata relating to the proxy output request; and
   receiving, from the proxy user that operates the output apparatus, an acquisition request, based on the document metadata in the other terminal apparatus, for outputting the stored data at the output apparatus, and providing the stored data in response to receiving the acquisition request.

2. The terminal apparatus as claimed in claim 1, wherein the method performed by the terminal apparatus further comprises:
   receiving a deleting request from the output apparatus that has finished outputting of the stored data; and
   deleting the stored data.

3. The terminal apparatus as claimed in claim 1, wherein the method performed by the terminal apparatus further comprises:
   storing the document metadata relating to the proxy output request; and
   determining, when receiving an acquisition request from the output apparatus, whether information for connecting to a storing apparatus is set, the storing apparatus being configured to provide the output apparatus with the stored data and the document metadata relating to the proxy output request,
   wherein when the information for connecting to the storing apparatus is set, (i) the data for which the proxy output request is received and (ii) the document metadata relating to the proxy output request are stored in the storing apparatus.

4. An information processing system comprising:
   a first terminal apparatus of a request user configured to transmit a proxy output request;
   a second terminal apparatus of a proxy user configured to receive the proxy output request from the request user, the proxy user being designated by a requesting user that requests the proxy output request; and
   an output apparatus configured to output data, the first terminal apparatus, the second terminal apparatus, and the output apparatus being connected via a network,
   wherein the first terminal apparatus comprises a processor and is configured by software execution by the processor to perform a method comprising:
   receiving the proxy output request delegating output of data at the output apparatus to the proxy user;
   acquiring information for connecting to the second terminal apparatus in association with the proxy user designated by the requesting user, from a management apparatus configured to manage the information for connecting to the second terminal apparatus in association with the proxy user;
   storing the data to be output at the output apparatus in response to receiving the proxy output request;
   transmitting, based on the acquired information, to the second terminal apparatus document metadata relating to the proxy output request; and
   receiving, from the proxy user that operates the output apparatus, an acquisition request, based on the document metadata in the other terminal apparatus, for outputting the stored data at the output apparatus, and provide the stored data in response to receiving the acquisition request,
   wherein the second terminal apparatus is configured by software execution to perform a method comprising:
   storing document metadata relating to the proxy output request transmitted from the first terminal, based on the acquired information; and
   providing the document metadata relating to the proxy output request to the output apparatus upon receiving a request from the output apparatus, and wherein
   the output apparatus is configured by software execution to perform a method comprising:
   acquiring document metadata relating to the proxy output request from the second terminal apparatus by using information for connecting to the second terminal apparatus in association with the proxy user acquired from the management apparatus;
   acquiring the data for which the proxy output request is received, from the first terminal apparatus by using the acquired document metadata; and
   outputting the data based on the acquired document metadata.

5. The information processing system as claimed in claim 4, wherein the method performed by the first terminal apparatus further includes
   receiving a deleting request from the output apparatus that has finished outputting of the data for which the proxy output request is received, and
   deleting the data for which the proxy output request is received.

6. The information processing system as claimed in claim 4, wherein the method performed by the first terminal apparatus further includes
   storing the document metadata relating to the proxy output request, and
   determining, when receiving an acquisition request from the output apparatus, whether information for connecting to a storing apparatus is set, the storing apparatus being configured to provide the output apparatus with the stored data and the document metadata relating to the proxy output request,
   wherein when the information for connecting to the storing apparatus is set, (i) the data for which the proxy output request is received and (ii) the document metadata relating to the proxy output request are stored in the storing apparatus.

7. An output method executed in an information processing system, the information processing system having a first terminal apparatus configured to transmit a proxy output request, a second terminal apparatus of a proxy user configured to receive the proxy output request from the request user, the proxy user being designated by a requesting user that requests the proxy output request, and an output apparatus configured to output data, the first terminal apparatus, the second terminal apparatus, and the output apparatus being connected via a network, the output method comprising:

causing the first terminal apparatus to receive the proxy output request delegating output of data at the output apparatus to the proxy user;

causing the first terminal apparatus to acquire information for connecting to the second terminal apparatus in association with the proxy user designated by the requesting user, from a management apparatus configured to manage the information for connecting to the second terminal apparatus in association with the proxy user;

causing the first terminal apparatus to store the data to be output at the output apparatus in response to receiving the proxy output request;

causing the first terminal apparatus to transmit, based on the acquired information, to the second terminal apparatus document metadata relating to the proxy output request; and causing the second terminal apparatus to store the document metadata relating to the proxy output request transmitted from the first terminal;

causing the output apparatus to acquire document metadata relating to the proxy output request from the second terminal apparatus by using the information for connecting to the second terminal apparatus in association with the proxy user acquired from the management apparatus;

causing the output apparatus to acquire the stored data from the first terminal apparatus by using the document metadata; and causing the output apparatus to output the stored data based on the document metadata.

8. The output method as claimed in claim 7, further comprising:

causing the first terminal apparatus to (i) receive a deleting request from the output apparatus that has finished outputting of the stored data, and (ii) delete the stored data.

9. The output method as claimed in claim 7, further comprising:

causing the first terminal apparatus to store the stored data and the document metadata relating to the proxy output request, and determining, when receiving an acquisition request from the output apparatus, whether information for connecting to a storing apparatus is set, the storing apparatus being configured to provide the output apparatus with the stored data and the document metadata relating to the proxy output request, wherein the first terminal apparatus stores, when the information for connecting to the storing apparatus is set, the stored data, and the document metadata relating to the proxy output request in the storing apparatus.

\* \* \* \* \*